United States Patent
Hall et al.

(10) Patent No.: US 12,472,459 B2
(45) Date of Patent: Nov. 18, 2025

(54) GRADIENT SEPARATOR SYSTEM AND METHOD

(71) Applicant: Ameresco, Inc., Framingham, MA (US)

(72) Inventors: Nathan Hall, Cape Elizabeth, ME (US); Mark Bruce, Gray, ME (US); Ben Russell, Portland, ME (US)

(73) Assignee: Ameresco, Inc., Framingham, MA (US)

( * ) Notice: Subject to any disclaimer, the term of this patent is extended or adjusted under 35 U.S.C. 154(b) by 0 days.

(21) Appl. No.: 19/045,204

(22) Filed: Feb. 4, 2025

(65) Prior Publication Data
US 2025/0196054 A1 Jun. 19, 2025

Related U.S. Application Data

(63) Continuation of application No. 18/978,973, filed on Dec. 12, 2024, now abandoned.

(60) Provisional application No. 63/609,613, filed on Dec. 13, 2023.

(51) Int. Cl.
*B01D 53/047* (2006.01)

(52) U.S. Cl.
CPC .... *B01D 53/0476* (2013.01); *B01D 2253/102* (2013.01); *B01D 2256/245* (2013.01); *B01D 2257/102* (2013.01); *B01D 2259/40052* (2013.01); *B01D 2259/45* (2013.01)

(58) Field of Classification Search
CPC .. B01D 53/04; B01D 53/047; B01D 53/0476; B01D 2253/102; B01D 2256/245; B01D 2256/10; B01D 2257/102; B01D 2257/7025; B01D 2259/40052; B01D 2259/45

USPC .......... 95/95–98, 101, 102, 104, 105, 143; 423/245.1
See application file for complete search history.

(56) References Cited

U.S. PATENT DOCUMENTS

| | | | |
|---|---|---|---|
| 3,944,400 A * | 3/1976 | Bird | C01B 23/00 96/111 |
| 4,452,612 A | 6/1984 | Mattia | |
| 4,461,630 A | 7/1984 | Cassidy et al. | |
| 6,514,318 B2 | 2/2003 | Keefer | |
| 2005/0045030 A1* | 3/2005 | Tonkovich | B01D 53/0446 95/90 |
| 2005/0284291 A1 | 12/2005 | Alizadeh-Khiavi et al. | |
| 2012/0180389 A1 | 7/2012 | Knaebel | |
| 2014/0033919 A1* | 2/2014 | Deckman | B01D 53/0473 95/100 |
| 2016/0016866 A1* | 1/2016 | Kawashima | C07C 7/12 585/822 |
| 2016/0272908 A1* | 9/2016 | Utaki | B01J 20/2808 |

(Continued)

OTHER PUBLICATIONS

International Search Report and Written Opinion mailed Apr. 1, 2025, in the International Patent Application: PCT/US2024/059781. 22 pages.

(Continued)

*Primary Examiner* — Frank M Lawrence, Jr.
(74) *Attorney, Agent, or Firm* — Wilmer Cutler Pickering Hale and Dorr LLP

(57) ABSTRACT

The present disclosure relates to separation methods, apparatuses, and systems for obtaining a gas product from a gas mixture. A component of a gas mixture may be nonuniformly adsorbing on a quantity of adsorbent and a portion of the quantity of adsorbent isolated and exposed to a partial vacuum to obtain the gas product.

20 Claims, 9 Drawing Sheets

(56) References Cited

U.S. PATENT DOCUMENTS

2018/0112142 A1\* 4/2018 Foody ..................... C10L 3/105
2025/0001351 A1\* 1/2025 Foody ..................... C10L 3/10

OTHER PUBLICATIONS

Xiao et al., "Nitrogen rejection from methane using dual-reflux pressure swing adsorption with a kinetically-selective adsorbent," Chemical Engineering Journal, available online Apr. 25, 2019, vol. 372, pp. 1038-1046.

\* cited by examiner

GRADIENT SEPARATOR SYSTEM AND METHOD

CROSS-REFERENCE TO RELATED APPLICATIONS

This patent application claims priority to U.S. Provisional Patent Application No. 63/609,613, filed Dec. 13, 2023, the contents of which is hereby incorporated by reference in its entirety.

TECHNICAL FIELD

The present specification relates to a method, apparatus, and system for gas (for example biogas) separation.

BACKGROUND

Adsorption-based gas separation systems generally comprise one or more adsorption vessels and plumbing to control the staged flow and recovery of feed gas, product gas, and by-product gas streams. Conventional designs for such systems have prioritized the use of standard vessel sizes fitted with relatively small inlet and outlet orifices that simplify system plumbing. However, while such configurations are relatively straightforward to deploy, separation efficiency can be relatively low. Moreover, even where standard vessel sizes and system plumbing have been employed, little consideration has been given to how adsorption kinetics could impact such configurations. With demand for such separation systems on increasingly larger scales, particularly in the renewable energy space, there is a need for improved methods, apparatus, systems, and software that can increase recovery at higher purity in fewer, more cost-effective operational stages.

BRIEF SUMMARY

An aspect of the present disclosure is based on the discovery that concentration gradients arising from nonuniform adsorption of a gas component in a quantity of adsorbent can be modulated and isolated into zones from which a product gas stream with improved component purity and greater component recovery can be obtained. A high-level illustration of this aspect of the present disclosure is provided in FIG. 1.

In FIG. 1, a mixed gas containing a primary component and a secondary component can be input into a first bed of adsorbent and nonuniformly adsorbed in the direction of flow shown (which may approximate plug flow). The resulting nonlinear concentration gradient (where a concentration can be measured as a relative percentage of the combined gas phase and adsorbed components per unit of bed volume) includes an "enrichment zone" (having a concentration of the primary component that is higher than the concentration of the primary component in the mixed gas) and a downstream "transition zone" characterized by an increasing concentration of the secondary component. Due to the limited permeability of the bed of adsorbent, this concentration gradient can persist long enough such that it is preserved in a gas removed when the first bed of adsorbent is evacuated and the resulting intermediate gas can be provided as an input with time-varying concentration of the components into a second bed of adsorbent, again in the direction of flow which may be approximately plug flow. By virtue of the time-varying input, the resulting nonlinear concentration profile modulates (amplifies) and left-shifts the transition zone to form a "recycle zone" (so-named because it may be advantageous to recycle gas from this zone to the initial bed of adsorbent) that still contains a significant percentage of the primary component. In addition, the "product zone" contains a higher purity of the primary component compared to the "enrichment zone" and a "by-product zone" contains a high concentration of the secondary component compared to the input concentration of the secondary component. Finally, due to modulation of the "transition zone" to form the "recycle zone", the "recycle zone" occupies a relatively small percentage of the bed volume (for example 10-20% of the bed volume). To increase recovery, gas recovered from the "recycle zone" may be recycled to the first bed of adsorbent. The delineation of product, recycle, and by-product zones can be fine-tuned for specific use cases.

A second aspect of the present disclosure is based on the discovery that the concentration of the primary component in gas obtained from the "product zone" is relatively stable over a wide range of input concentrations in the gas mixture. Similarly, the concentration of the secondary component in gas obtained from the "by-product zone" is relatively stable over a wide range of input concentrations in the gas mixture. Nonetheless, the gas mixture composition has a significant impact on the location of the "recycle zone" within the second bed of adsorbent. Certain embodiments disclosed below relate to controlling the location of the "recycle zone" in the second bed of adsorbent.

A third aspect of the present disclosure is based on the discovery that the volume of the "transition zone" can be reduced when the first bed of adsorbent and/or the second bed of adsorbent are each vertically oriented and are filled with gas from the bottom up (instead of top down). Certain embodiments disclosed below relate to increasing the quantity of product gas recovered by reducing the volume of the transition zone. In certain embodiments, for example, filling gas from the bottom up may be employed to reduce the volume of the transition zone. In certain embodiments, for example, the first bed of adsorbent and/or the second bed of adsorbent are each vertically oriented and are filled with gas from the top down (for example, to minimize bed lift) while still providing a suitable volume of the transition zone.

The foregoing description illustrates certain nonlimiting aspects of the present disclosure. Further aspects are disclosed herein.

Certain embodiments may provide, for example, a separation process (for example a separation process based on relative selectivity of an adsorbent for a component in a gas mixture). In certain embodiments, for example, the separation process may comprise inputting a gas mixture (for example a biogas comprising a mixture of methane and nitrogen) into a plurality of gas separation segments that contains a quantity of adsorbent (for example a plurality of segments at least two of which contain a fixed bed of activated carbon such as a pelletized activated carbon). In certain embodiments, for example, the separation process may comprise isolating a segment of the plurality of segments (for example isolating the segment from the other segments, for example by closing one or a plurality of valves) before the gas mixture becomes uniformly mixed (for example mixing via diffusion and/or equilibrium between gas present in the elongated bed and the adsorbent) throughout the plurality of segments (for example isolating the segment after a predetermined period of time or when a predetermined pressure is reached). In certain embodiments, for example, the separation process may comprise exposing the isolated segment to a partial vacuum to obtain a gas product (for example, withdrawing trapped gas in the segment and a desorbed component from adsorbent in the segment and compressing the withdrawn gas to form the gas product).

A. In certain embodiments, for example, the plurality of segments may comprise a first cylindrical segment and a second cylindrical segment, and the length of the plurality of segments may be the length of the first cylindrical segment plus the length of the first cylindrical segment. In certain embodiments, for example, the plurality of segments may comprise a first cylindrical segment, a second cylindrical segment, and a third cylindrical segment, and the length of the plurality of segments may be the length of the first cylindrical segment plus the length of the first cylindrical segment plus the length of the third cylindrical segment. In general, when the plurality of segments comprises N segments, the length of the plurality of segments is the length of the N segments added together, where the length is defined in the main direction of flow of the gas mixture through the plurality of segments.

In certain embodiments, for example, the length-to-diameter ratio of the plurality of segments may be selected such that the height of a velocity profile of a gas flowing through the plurality of segments is less than 10% (for example, less than 5%, less than 1%, or less than 0.1%) of the length of the plurality of segments. In certain embodiments, for example, the length-to-diameter ratio of the plurality of segments may be at least 1:1, at least 1.5:1, at least 2:1, at least 3:1, at least 3.5:1, at least 4:1, at least 5:1, at least 7:1, at least 10:1, at least 14:1, at least 20:1, at least 25:1, at least 30:1, at least 40:1, or the length-to-diameter ratio of the plurality of segments may be at least 50:1. In certain embodiments, for example, the length-to-diameter ratio of the plurality of segments may be in the range of between 1:1 and 3:1, in the range of between 1.5:1 and 2.5:1, in the range of between 2.5:1 and 3.5:1, in the range of between 3.5:1 and 4.5:1, in the range of between 5:1 and 15:1, in the range of between 10:1 and 20:1, in the range of between 14:1 and 20:1, in the range of between 20:1 and 30:1, in the range of between 24:1 and 30:1, in the range of between 25:1 and 35:1, or the length-to-diameter ratio of the plurality of segments may be in the range of between 14:1 and 28:1.

If the cross-section of the plurality of segments is not circular and/or not constant, the forgoing length-to-diameter ratio ranges may be based on any appropriate measure of the cross-sectional dimension known to a person of ordinary skill in the technical field. For example, if the cross section is a square, then the appropriate "diameter" measure may be a width; if the cross-section is non-constant, then the appropriate measure may be an average along the length of the plurality of segments; etc.).

B. In certain embodiments, for example, the gas mixture may comprise a first component and a second component. In certain embodiments, for example, the quantity of adsorbent may selectively adsorb the first component relative to the second component. In certain embodiments, for example, the first component will form a nonlinear concentration profile in a direction of flow of the gas mixture through the quantity of adsorbent.

In certain embodiments, for example, a concentration profile of the first component in the direction of flow through the quantity of adsorbent may start (at the location where the gas mixture is introduced to the quantity of adsorbent) at a concentration that is approximately an equilibrium concentration based on the gas mixture composition, and then (potentially after a plateau of approximately constant concentration of the first component) undergo a transition in which the concentration gradient of the first component may decrease (become more negative) in the direction of flow of the gaseous component until an inflection point is reached where the concentration gradient of the first component may increase (become less negative). In certain embodiments, downstream of the inflection point the concentration profile of the first component may reach an approximate floor in concentration. In certain embodiments, for example, the concentration profile of the first component may be monotonically non-increasing in the direction of flow of the gas mixture along the length of the plurality of segments. In certain embodiments, for example, the concentration profile of the first component may be approximated by interpolating or spline fitting a series of concentration measurements of the first component in the quantity of adsorbent (for example in the direction of flow of the gas mixture along the length of the plurality of segments). In certain embodiments, for example, the approximated concentration profile of the first component may be S-shaped. In certain embodiments, for example, the approximated concentration profile of the first component may be ramp-shaped (for example approximately a unit ramp shaped curve). In certain embodiments, for example, the approximated concentration profile of the first component may define a third order curve.

In certain embodiments, for example, the second component will form a nonlinear concentration profile in a direction of flow of the gas mixture through the quantity of adsorbent. In certain embodiments, for example, a concentration profile of the second component in the direction of flow through the quantity of adsorbent may start (at the location where the gas mixture is introduced to the quantity of adsorbent) at a concentration that is approximately an equilibrium concentration based on the gas mixture composition, and then (potentially after a plateau of approximately constant concentration of the second component) undergo a transition in which the concentration gradient of the second component may increase (become more positive) in the direction of flow of the gaseous component until an inflection point is reached where the concentration gradient of the second component may decrease (become less positive). In certain embodiments, downstream of the inflection point the concentration profile of the second component may reach a second plateau in concentration. In certain embodiments, for example, the concentration profile of the second component may be monotonically non-decreasing in the direction of flow of the gas mixture. In certain embodiments, for example, the concentration profile of the second component may be approximated by interpolating or spline fitting a series of concentration measurements of the second component in the quantity of adsorbent (for example in the direction of flow of the gas mixture along the length of the plurality of segments). In certain embodiments, for example, the approximated concentration profile of the second component may be S-shaped. In certain embodiments, for example, the approximated concentration profile of the second component may be ramp-shaped (for example approximately a unit ramp shaped curve). In certain embodiments, for example, the approximated concentration profile of the second component may define a third order curve.

In certain embodiments, for example, the concentration profiles of the first component and the second component may comprise a crossover between the concentrations of the first component and the second component. In certain embodiments, for example, the concentration profiles of the first component comprise an inflection point.

In certain embodiments, for example, the selectivity of the adsorbent for the first component compared to the second component may be expressed as a selectivity ratio on a mole basis and may be greater than 1:1, for example greater than 1.5:1, greater than 2:1, greater than 4:1, greater than 5:1, or the selectivity ratio of the first component to the second component may be greater than 10:1. In certain embodiments, for example, the selectivity ratio of the first component to the second component (on a mole basis) may be in the range of between 1.5:1 and 10:1, for example in the range of between 2:1 and 8:1, in the range of between 3:1 and 6:1, in the range of between 2:1 and 5:1, or the selectivity ratio of the first component to the second component (on a mole basis) may be in the range of between 3:1 and 5:1.

In certain embodiments, for example, concentration (or mass distribution) may be defined as a fraction equal to (a) the moles of gaseous first component and adsorbed first component per unit of volume containing the adsorbent divided by (b) the total moles of gas and adsorbed gas components per unit of volume containing the adsorbent.

C. In certain embodiments, for example, the above-noted transition in the concentration of the first component from a high concentration to a low concentration (also referred to as the "transition zone" and/or "recycle zone" in FIG. 1) occurs within a portion of the quantity of adsorbent (for example within an intermediate segment among the plurality of segments). In certain embodiments, for example, at least 50% (for example in the range of between 50%-60%, in the range of between 60%-70%, in the range of between 70%-80%, in the range of between 80%-90%, in the range of between 90%-95%, or in the range of between 95%-99%) of a change in concentration between a maximum concentration of a component of the gas mixture in the plurality of segments and a minimum concentration of the component of the gas mixture in the plurality of segments occurs in a second segment of the plurality of segments and the second segment comprises less than 40% (for example in the range of between 30%-40%, in the range of between 20%-30%, in the range of between 10%-20%, in the range of between 5%-10%, in the range of between 1%-5%, or in the range of between 8%-24%) of a volume of the plurality of segments.

In certain embodiments, for example, the location of the transition in the concentration of the first component from a high concentration to a low concentration is adjusted in a subsequent cycle of the separation process. In certain embodiments, for example, the location of the concentration transition in a subsequent cycle of the separation process is moved away (downstream) from an inlet where the gas mixture is input into the plurality of segments. In certain embodiments, for example, the location of the concentration transition is moved away (downstream) from the inlet by recycling a portion of gas product to the inlet. In certain embodiments, for example, the recycling is performed while venting gas from a downstream segment of the plurality of segments (for example at a constant pressure). In certain embodiments, for example, the portion of gas product may be recycled to the inlet in order to maintain the location of the concentration transition within a predetermined intermediate segment of the plurality of segments. In certain embodiments, for example, the portion of gas product may be recycled to the inlet in response to measurements that the purity of a first component in the gas product is low (for example, in the range of between 1% and 5%, or more than 5% lower than a target purity) and that the recovery exceeds a predetermined level (for example, a recovery of greater than a predetermined level of 50%, greater than a predetermined level of 60%, greater than a predetermined level of 70%, greater than a predetermined level of 80%, greater than a predetermined level of 90%, greater than a predetermined level of 95%, or greater than a predetermined level of 99%). In certain embodiments, for example, the portion of the gas product that is recycled may be in the range of between 5% and 50% of the gas product, for example, in the range of between 5% and 10%, in the range of between 10% and 20%, in the range of between 20% and 30%, or the portion of the gas product that is recycled may be in the range of between 30% and 50% of the gas product.

In certain embodiments, for example, the location of the concentration transition may be moved towards the inlet in the subsequent cycle of the separation process. In certain embodiments, for example, the location of the concentration transition is moved towards the inlet by shortening the plurality of segments (for example by reducing the volume of or removing a downstream segment of the plurality of segments) whereby the pressure of the plurality of segments is increased and concentration profile of a first component is compressed. In certain embodiments, for example, the volume of the plurality of segments may be reduced by in the range of between 5% and 50% of the volume of the plurality of segments, for example, in the range of between 5% and 10%, in the range of between 10% and 20%, in the range of between 20% and 30%, in the range of between 30% and 50% of the volume of the plurality of segments. In certain embodiments, for example, the portion of the plurality of segments that is removed to reduce the volume of the plurality of segments does not contain any of the quantity of adsorbent. In certain embodiments, for example, the portion of gas product is recycled to the inlet in response to measurements that the purity of a first component in the gas product is high (for example, in the range of between 1% and 5%, or more than 5% higher than a target purity) and that the recovery is below a predetermined level (for example, a recovery of less than a predetermined level of 50%, less than a predetermined level of 60%, less than a predetermined level of 70%, less than a predetermined level of 80%, less than a predetermined level of 90%, less than a predetermined level of 95%, or less than a predetermined level of 99%).

D. In certain embodiments, for example, the gas product may have a higher concentration of a component than a concentration of the component in the gas mixture. In certain embodiments, for example, the component may comprise between 50% and 90% of the gas mixture, for example in the range of between 50% and 75% of the gas mixture, in the range of between 75% and 90% of the gas mixture, in the range of between 60% and 80% of the gas mixture, or the component may in the range of between 80% and 90% of the gas mixture. In certain embodiments, for example, the component may be methane.

In certain embodiments, for example, the concentration of the component in the gas product may be expressed as a function of the concentration of the component in the gas mixture. In certain embodiments, for example, the component may be present in the gas product at a concentration expressed as (a) the concentration of the component in the gas mixture, plus (b) Y times (100% minus the concentration of the component in the gas mixture). In certain embodiments, for example, Y may be in the range of between 10% and 99%, in the range of between 25% and 95%, in the range of between 35% and 80%, in the range of between 50% and 90%, in the range of between 50% and 95% in the range of between 75% and 95%, or Y may be in the range of between 60% and 80%.

In certain embodiments, for example, the percentage of the component present in the gas mixture recovered in the gas product ("recovery") may be in the range of between 10% and 99%, in the range of between 25% and 95%, in the range of between 35% and 80%, in the range of between 50% and 90%, in the range of between 50% and 95% in the range of between 75% and 95%, or the percentage of the component present in the gas mixture recovered in the gas product may be in the range of between 60% and 80%. In certain embodiments, for example, the component in the gas product may be present at a concentration (or purity) of at least 80%, at least 85%, at least 90%, at least 92%, at least 93%, at least 94%, at least 95%, at least 96%, at least 97%, at least 98%, at least 99%, at least 99.5%, at least 99.9%, in the range of between 90% and 99.9%, in the range of between 90% and 99.5%, in the range of between 95% and 99.9%, in the range of between 97% and 99.9%, in the range of between 98% and 99.9%, or the component in the gas product may be present at a concentration (or purity) of 99% and 99.9% (for example 99.5%).

In certain embodiments, for example, Y may be in the range of between 70% and 95% and the recovery may be in the range of between 70% and 95%, for example Y may be in the range of between 75% and 90% and the recovery may be in the range of between 70% and 95%, Y may be in the range of between 80% and 90% and the recovery may be in the range of between 70% and 95%, Y may be in the range of between 85% and 95% and the recovery may be in the range of between 70% and 95%, Y may be in the range of between 75% and 90% and the recovery may be in the range of between 80% and 95%, Y may be in the range of between 80% and 90% and the recovery may be in the range of between 80% and 95%, Y may be in the range of between 85% and 95% and the recovery may be in the range of between 80% and 95%, Y may be in the range of between 75% and 90% and the recovery may be in the range of between 85% and 95%, Y may be in the range of between 80% and 90% and the recovery may be in the range of between 85% and 95%, Y may be in the range of between 85% and 95% and the recovery may be in the range of between 85% and 95%, Y may be in the range of between 75% and 90% and the recovery may be in the range of between 80% and 90%, Y may be in the range of between 80% and 90% and the recovery may be in the range of between 80% and 90%, or Y may be in the range of between 85% and 95% and the recovery may be in the range of between 80% and 90%. In certain embodiments, for example, the component may be methane, and a second component present in the gas mixture may be nitrogen.

E. In certain embodiments, for example, inputting may comprise inputting the gas mixture into a first segment of the plurality of segments. In certain embodiments, for example, the gas mixture may be communicated between multiple segments of the plural segments prior to the isolating. In certain embodiments, for example, gas from a segment of the plurality of segments may be obtained independently of another segment of the plurality of segments. In certain embodiments, for example, gas from a segment of the plurality of segments may be recycled to another segment of the plurality of segments. In certain embodiments, gas from a terminal segment of the plurality of segments may be obtained by evacuating the terminal segment, and then gas from another segment may be obtained by deisolating the another segment from the terminal segment and evacuating the another segment via the terminal segment. In certain embodiments, for example, the isolating may occur after the plurality of segments is at a common pressure. In certain embodiments, for example, the partial vacuum may be at a pressure of between 0.01 PSIA and 10 PSIA, for example at a pressure in the range of between 0.05 PSIA and 5 PSIA, in the range of between 0.05 PSIA and 2 PSIA, in the range of between 0.1 PSIA and 3 PSIA, in the range of between 0.1 PSIA and 0.5 PSIA, or the partial vacuum may be at a pressure of between 2 PSIA and 7 PSIA.

F. In certain embodiments, for example, the isolated volume may be at a pressure in the range of between 10 PSIA and 100 PSIA, for example at a pressure in the range of between 10 PSIA and 75 PSIA, in the range of between 25 PSIA and 75 PSIA, in the range of between 50 PSIA and 70 PSIA, in the range of between 55 PSIA and 65 PSIA, in the range of between 30 PSIA and 60 PSIA, in the range of between 50 PSIA and 60 PSIA, in the range of between 60 PSIA and 90 PSIA, in the range of between 60 PSIA and 70 PSIA, or the isolated volume may be at a pressure in the range of between in the range of between 20 PSIA and 25 PSIA. In certain embodiments, for example, a processing capacity per processing cycle of the separation process is controlled by controlling a pressure at which isolating the segment occurs. In certain embodiments, for example, operating pressure of the separation process is increased in response to an increased quantity of the gas mixture to be processed. In certain embodiments, for example, the relative selectivity of the quantity of adsorbent for a component of the gas mixture (for example a primary component in the gas product) is approximately constant as a function of pressure.

Certain embodiments may provide, for example, a non-transitory computer readable medium storing instructions that, when executed by one or more computer processors, cause the one or more computer processors to implement control logic to control a pressure at which isolating the segment occurs.

Certain embodiments may provide, for example, a separation process. In certain embodiments, for example, the separation process may comprise inputting a gaseous component (for example methane in a feed gas comprising methane and nitrogen) at a plurality of component concentrations into a volume that contains an adsorbent (for example a vessel containing adsorbent that is one of a plurality of adsorbent-containing vessels that are initially in fluid communication and that together form a separation unit). In certain embodiments, for example, the separation process may comprise isolating the volume (for example isolating the volume from fluid communication in or out of the volume). In certain embodiments, for example, the separation process may comprise exposing the isolated volume to a partial vacuum to obtain a gas product (for example a gas product comprising un-adsorbed gas in the volume and additional gas containing a valuable component that becomes desorbed under the partial vacuum).

A. In certain embodiments, for example, the volume may have a length associated with a main direction of flow of the gaseous component through the volume. In certain embodiments, for example, the volume may be cylindrical, and the main direction of flow of the gaseous component may be the direction of the length dimension of the cylindrical volume.

In certain embodiments, for example, the length-to-diameter ratio of the volume may be selected such that the height of a velocity profile of a gas flowing through the volume is less than 10% (for example, less than 5%, less than 1%, or less than 0.1%) of the length of the volume. In certain embodiments, for example, the length-to-diameter ratio of the volume may be at least at least 1:1, at least 2:1, at least 3:1, at least 4:1, at least 5:1, at least 6:1, at least 10:1, at least 14:1, at least 20:1, at least 25:1, at least 30:1, at least 40:1, or the length-to-diameter ratio of the volume may be at least 50:1. In certain embodiments, for example, the length-todiameter ratio of the volume may be in the range of between 1:1 and 50:1, for example in the range of between 1:1 and 6:1, in the range of between 1:1 and 2:1, in the range of between 2:1 and 3:1, in the range of between 3:1 and 4:1, in the range of between 4:1 and 5:1, in the range of between 5:1 and 6:1, in the range of between 5:1 and 30:1, in the range of between 5:1 and 15:1, in the range of between 10:1 and 20:1, in the range of between 14:1 and 20:1, in the range of between 20:1 and 30:1, in the range of between 24:1 and 30:1, in the range of between 25:1 and 35:1, or the length-to-diameter ratio of the volume may be in the range of between 14:1 and 28:1.

In certain embodiments, for example, the volume may be defined by the interior of a cylinder, a frustum, or any other elongated shape with a length (or axial dimension) associated with a direction of flow of gas and a cross-section for which the adsorption is relatively uniform at a given axial position. The resulting vessel may be constructed of steel (for example stainless-steel), aluminum, polymer (for example polyvinyl chloride) or any other solid material that is nonreactive with a gas feed and is structurally sound under the range of operating conditions including low pressure (for example a pressure of less than 5 PSIA) and a design pressure (for example, 25 PSIA, 100 PSIA, or other pressure as the case may be based on the required processing capacity of the system).

B. In certain embodiments, for example, the plurality of component concentrations may be a time-varying input concentration of the component. In certain embodiments, for example, the plurality of component concentrations may be obtained from a prior separation stage (for example a prior separation stage comprising a bed of adsorbent). In certain embodiments, for example, the prior separation stage may sculpt (for example, precondition) the input gas to have a desired time-varying input concentration of the component. In certain embodiments, for example, a gas conditioning process may comprise (a) inputting a gas mixture into an elongated bed of adsorbent; and (b) exposing the elongated bed of adsorbent to a further partial vacuum before the gas mixture becomes uniformly mixed throughout the elongated bed of adsorbent.

C. In certain embodiments, for example, the gaseous component is contacted with the adsorbent. In certain embodiments, for example, the volume is isolated after a portion of the input gaseous component has flowed through the volume.

Certain embodiments may provide, for example, a separation process. In certain embodiments, for example, the separation process may comprise nonuniformly adsorbing a component of the gas mixture on a quantity of adsorbent (for example a quantity of adsorbent divided among a plurality of segments). In certain embodiments, for example, the separation process may comprise isolating a volume containing a portion of the gas mixture and a portion of the quantity of adsorbent. In certain embodiments, for example, the separation process may comprise exposing the volume to a partial vacuum to obtain a gas product.

In certain embodiments, for example, a quantity of gas product (for example, as measured by weight, moles, or gas volume under specified conditions) obtained by the exposing is a function of location of the volume in the quantity of adsorbent. In certain embodiments, for example, the quantity of adsorbent may have a length oriented in the direction of flow of the gas mixture, whereby the quantity of gas obtained from the volume is greater than the quantity of gas obtained when the volume is a downstream volume (relative to the upstream volume). In certain embodiments, for example, more than 50% of the recoverable gas product is located in less than 50% of the quantity of adsorbent. In certain embodiments, for example, more than 60% of the recoverable gas product is located in less than 40% of the quantity of adsorbent. In certain embodiments, for example, more than 70% of the recoverable gas product is located in less than 30% of the quantity of adsorbent. In certain embodiments, for example, more than 80% of the recoverable gas product is located in less than 20% of the quantity of adsorbent. In certain embodiments, for example, in the range of between 50% and 60% of the recoverable gas product is located in a quantity of adsorbent in the range of between 40% and 50% of the quantity of adsorbent. In certain embodiments, for example, in the range of between 60% and 70% of the recoverable gas product is located in a quantity of adsorbent in the range of between 30% and 40% of the quantity of adsorbent. In certain embodiments, for example, in the range of between 70% and 80% of the recoverable gas product is located in a quantity of adsorbent in the range of between 20% and 30% of the quantity of adsorbent. In certain embodiments, for example, the location and size of the volume are selected to obtain a specified percentage (or range of percentages) of recoverable gas product in a specified percentage (or range of percentages) of the quantity of adsorbent.

Certain embodiments may provide, for example, a multi-stage separation process in which a gas mixture is passed through two or more stages of adsorption using an adsorbent. In certain embodiments, for example, a gas mixture may comprise a first component with a greater binding affinity to the adsorbent than a second component. In certain embodiments, the gas mixture may be isolated in a first stage comprising a bed of adsorbent resulting in a concentration gradient in the first stage in which the concentration of the second component increases in the downstream direction. For example, certain embodiments may provide taking gas from a downstream end of the first bed of adsorbent having a higher concentration of the second component than the first component and pumping it into a second bed of the same adsorbent in order to modulate (for example amplify) a concentration gradient to produce a high purity first component at a proximal end of the second bed and a high purity second component at a distal end of the second bed, with a steep concentration gradient in a portion of the second bed between the two ends.

Certain embodiments may provide, for example, a separation process. In certain embodiments, for example, the separation process may comprise forming a gaseous input to a separation unit that provides a plurality of input concentrations of a component to the separation unit. In certain embodiments, for example, the forming may comprise inputting a gas mixture into an elongated bed of adsorbent (for example by plug flow or approximately plug flow of the gas mixture through the elongated bed of adsorbent). In certain embodiments, for example, the forming may comprise exposing the elongated bed of adsorbent to a partial vacuum before the gas mixture becomes uniformly mixed (for example mixing via diffusion and/or equilibrium between gas present in the elongated bed and the adsorbent) throughout the elongated bed of adsorbent. In certain embodiments, for example, the forming may comprise compressing a partial vacuum product to form the gaseous input. In certain embodiments, for example, the separation process may comprise inputting the gaseous input into the separation unit. In certain embodiments, for example, the separation unit may comprise three segments in series. In certain embodiments, for example, the three segments may comprise a first adsorbent-containing segment configured to receive the gaseous input. In certain embodiments, for example, the three segments may comprise a second adsorbent-containing segment in fluid communication with the first adsorbent-containing segment. In certain embodiments, for example, the three segments may comprise a third segment in fluid communication with the second adsorbent-containing segment. In certain embodiments, for example, the separation process may comprise isolating the three segments from one another before the gaseous input becomes uniformly mixed between the three segments. In certain embodiments, for example, the separation process may comprise recovering a first gas product, a second gas product, and a third gas product from the three segments. In certain embodiments, for example, the first gas product may have a first gas product component concentration that is higher than a second gas product component concentration of the second gas product. In certain embodiments, for example, the third gas product may have a third gas product component concentration that is higher than the second gas product component concentration.

A. In certain embodiments, for example, the elongated bed of adsorbent may have a length associated with a main direction of flow of the gaseous component through the elongated bed of adsorbent. In certain embodiments, for example, the elongated bed of adsorbent may be cylindrical, and the main direction of flow of the gaseous component may be the direction of the length dimension of the cylindrical elongated bed of adsorbent. In certain embodiments, for example, the length-to-diameter ratio of the elongated bed of adsorbent may be selected such that the height of a velocity profile of a gas flowing through the elongated bed of adsorbent is less than 10% (for example, less than 5%, less than 1%, or less than 0.1%) of the length of the elongated bed of adsorbent. In certain embodiments, for example, the length-to-diameter ratio of the elongated bed of adsorbent may be at least 1:1, at least 2:1, at least 3:1, at least 4:1, at least 5:1, at least 6:1, at least 10:1, at least 14:1, at least 20:1, at least 25:1, at least 30:1, at least 40:1, or the length-to-diameter ratio of the elongated bed of adsorbent may be at least 50:1. In certain embodiments, for example, the length-to-diameter ratio of the elongated bed of adsorbent may be in the range of between 1:1 and 50:1, for example in the range of between 1:1 and 6:1, in the range of between 1:1 and 2:1, in the range of between 2:1 and 3:1, in the range of between 3:1 and 4:1, in the range of between 4:1 and 5:1, in the range of between 5:1 and 6:1, in the range of between 5:1 and 30:1, in the range of between 5:1 and 15:1, in the range of between 10:1 and 20:1, in the range of between 14:1 and 20:1, in the range of between 20:1 and 30:1, in the range of between 24:1 and 30:1, in the range of between 25:1 and 35:1, or the length-to-diameter ratio of the elongated bed of adsorbent may be in the range of between 14:1 and 28:1.

B. In certain embodiments, for example, the gas mixture may comprise a first component and a second component. In certain embodiments, for example, the elongated bed may selectively adsorb (for example, due to greater binding affinity) the first component relative to the second component. In certain embodiments, for example, the first component will form a nonlinear concentration profile (for example where concentration is defined as a fraction equal to (a) the moles of gaseous first component and adsorbed first component per unit of volume containing the adsorbent divided by (b) the total moles of gas and adsorbed gas components per unit of volume containing the adsorbent) in a direction of flow of the gas mixture through the elongated bed. In certain embodiments, for example, a concentration profile of the first component in the direction of flow through the elongated bed may start (at the location where the gas mixture is introduced to the elongated bed) at a concentration that is approximately an equilibrium concentration based on the gas mixture composition, and then (potentially after a plateau of approximately constant concentration of the first component) undergo a transition in which the concentration gradient of the first component may decrease (become more negative) in the direction of flow of the gaseous component until an inflection point is reached where the concentration gradient of the first component may increase (become less negative). In certain embodiments, downstream of the inflection point the concentration profile of the first component may reach a second plateau in concentration. In certain embodiments, for example, the concentration profile of the first component may be monotonically non-increasing in the direction of flow of the gas mixture. In certain embodiments, for example, the concentration profile of the first component may be approximated by interpolating or spline fitting a series of concentration measurements of the first component in the elongated bed. In certain embodiments, for example, the approximated concentration profile of the first component may be S-shaped. In certain embodiments, for example, the approximated concentration profile of the first component may be ramp-shaped (for example approximately a unit ramp shaped curve). In certain embodiments, for example, the approximated concentration profile of the first component may define a third order curve.

In certain embodiments, for example, the second component will form a nonlinear concentration profile (where concentration is defined as a fraction equal to (a) the moles of gaseous second component and adsorbed second component per unit of volume containing the adsorbent divided by (b) the total moles of gas and adsorbed gas components per unit of volume containing the adsorbent) in a direction of flow of the gas mixture through the elongated bed. In certain embodiments, for example, a concentration profile of the second component in the direction of flow through the elongated bed may start (at the location where the gas mixture is introduced to the elongated bed) at a concentration that is approximately an equilibrium concentration based on the gas mixture composition, and then (potentially after a plateau of approximately constant concentration of the second component) undergo a transition in which the concentration gradient of the second component may increase (become more positive) in the direction of flow of the gaseous component until an inflection point is reached where the concentration gradient of the second component may decrease (become less positive). In certain embodiments, downstream of the inflection point the concentration profile of the second component may reach a second plateau in concentration. In certain embodiments, for example, the concentration profile of the second component may be monotonically non-decreasing in the direction of flow of the gas mixture. In certain embodiments, for example, the concentration profile of the second component may be approximated by interpolating or spline fitting a series of concentration measurements of the second component in the elongated bed. In certain embodiments, for example, the approximated concentration profile of the second component may be S-shaped. In certain embodiments, for example, the approximated concentration profile of the second component may be ramp-shaped (for example approximately a unit ramp shaped curve). In certain embodiments, for example, the approximated concentration profile of the second component may define a third order curve.

C. In certain embodiments, for example, the concentration profile of the first component traversing the three segments may be more nonlinear (for example as a higher concentration gradient and/or greater curvature) than the concentration profile of the first component in the elongated bed. In certain embodiments, for example, the concentration profile of the second component traversing the three segments may be more nonlinear (for example as a higher concentration gradient and/or greater curvature) than the concentration profile of the first component in the elongated bed.

In certain embodiments, for example, the location of a transition zone in the concentration profile of the first component in the separation unit may be determined. In certain embodiments, for example, the transition zone may correspond to a volume of the separation unit in which a concentration of the first component transitions from a predetermined high concentration to a predetermined low concentration. In certain embodiments, for example, the transition zone maybe identified by monitoring the concentration of the first component in the first gas product. In certain embodiments, for example, the transition zone maybe identified by monitoring the concentration of the first component in the second gas product. In certain embodiments, for example, the transition zone may be identified by monitoring the concentration of the component in the third gas product. In certain embodiments, for example, the transition zone may be identified by monitoring temperature at one or more locations in the separation unit. In certain embodiments, for example, the transition zone may be identified based on one or more temperature differentials in the separation unit.

D. In certain embodiments, for example, a portion of the first gas product may be recycled to the first adsorbent-containing segment (for example the first gas product from a production cycle may be recycled to the first adsorbent-containing segment in a second production cycle after to the introduction of the gaseous input obtained from the elongated bed in order to shift the transition zone downstream). In certain embodiments, for example, the recycling may be performed in response to one or more of a measurement that a concentration of the component in the feed has decreased, a measurement that a target concentration of the component in the first gas product is below a predetermined concentration, a measurement that a volume of the first gas product is above a predetermined volume, a measurement that a target concentration of the component at an inlet to the third segment is below a further predetermined target concentration, and a measurement of a temperature differential in the separation unit. In certain embodiments, for example, gas may be bled off from the third segment (for example at a constant pressure) during the recycling.

In certain embodiments, for example, a volume of the third segment may be reduced (for example to compress the concentration profile to a smaller volume in order to shift the transition zone upstream). In certain embodiments, for example, the volume of the third segment may be reduced (for example, one or more vent tanks may be removed, temporarily taken off line, and/or replaced with a different vent tank) in response to one or more of a measurement that a concentration of the component in the feed has increased, a measurement that a target concentration of the component in the first gas product is above a predetermined concentration, a measurement that a volume of the first gas product is below a predetermined volume, and a measurement of a temperature differential in the separation unit.

E. In certain embodiments, for example, the first adsorbent-containing segment may be contained in a first vessel (for example a cylindrical vessel). In certain embodiments, for example, the second adsorbent-containing segment may be contained in a second vessel (for example a cylindrical vessel). In certain embodiments, for example, the third segment may be contained in a third vessel or the third segment may be contained in a plurality of third vessels (for example a cylindrical vessel). In certain embodiments, for example, the first vessel, the second vessel, and the third vessel are arranged in series. In certain embodiments, for example, the separation unit comprises a valve disposed between the first vessel and the second vessel, and a valve disposed between the second vessel and the third vessel.

In certain embodiments, for example, the first adsorbent-containing segment, second adsorbent-containing segment, and third segment are integral. In certain embodiments, the adsorbent in the first adsorbent-containing segment and the adsorbent in the second adsorbent-containing segment are separated by an internal value such as a butterfly valve or an integral gate.

In certain embodiments, for example, the third segment may contain adsorbent. In certain embodiments, for example, the third segment may not contain adsorbent. In certain embodiments, for example, a volume of the third segment that does not contain adsorbent is larger than a volume of the third segment that does contain adsorbent.

In certain embodiments, for example, the third segment may have a configurable volume. In certain embodiments for example, the third segment may comprise a plurality of vessels that can be used in combination and/or in the alternative to adjust the volume of the third segment (for example in order to control the location of a concentration profile).

In certain embodiments, for example, a pressure of the third segment (for example a third segment containing no adsorbent) may be regulated to equalized pressure with the first adsorbent-containing segment and the second adsorbent-containing segment. In certain embodiments, for example, the third segment may be replaced (for example, the third product gas can be collected and removed from the separation unit without storing the third product gas in a third segment) by a pressure regulator (for example, a back pressure regulator).

F. In certain embodiments, for example, the second adsorbent-containing segment may comprise less than 20% (for example in the range of between 8% and 15%) of a combined volume of the three segments. In certain embodiments, the third product gas may be a byproduct gas (for example containing methane) that is sent to a flare. In certain embodiments, the third product gas may be a byproduct gas (for example a high purity Nitrogen stream with greater than 90% Nitrogen, for example in the range of between 95% and 99% Nitrogen) that can be vented directly to the atmosphere.

Certain embodiments may provide, for example, a non-transitory computer readable medium storing instructions that, when executed by one or more computer processors, cause the one or more computer processors to implement control logic to control the recycling. In certain embodiments, for example, the instructions may process data (for example, any of the aforementioned concentration or temperature data) for use by the control logic. Certain embodiments may provide, for example, a non-transitory computer readable medium storing instructions that, when executed by one or more computer processors, cause the one or more computer processors to implement control logic to control the volume of the third segment. In certain embodiments, for example, the instructions may process data (for example, any of the aforementioned concentration or temperature data) for use by the control logic.

Certain embodiments may provide, for example, a separation process. In certain embodiments, for example, the separation process may comprise feeding a quantity of a variable-concentration gas mixture into a gas separation unit at a fed concentration of a first component that increases during at least part of the feeding (for example is monotonically non-decreasing and that increases) and at a fed concentration of a second component that decreases (for example is monotonically non-increasing and that decreases) during at least part of the feeding. In certain embodiments, for example, the separation process may comprise introducing the fed quantity to an initial stage of the gas separation unit and isolating a first portion of the feed quantity in the initial stage, the initial stage comprising an initial gas separation media having a greater selectivity for the first component than for the second component. In certain embodiments, for example, the separation process may comprise capturing a quantity of the first component via the initial gas separation media. In certain embodiments, for example, the separation process may comprise passing a second portion of the fed quantity from the initial stage to an intermediate stage of the gas separation unit and isolating the second portion in the intermediate stage, the intermediate stage comprising an intermediate gas separation media having a greater selectivity for the first component than for the second component. In certain embodiments, for example, the separation process may comprise further passing a third portion of the fed quantity from the intermediate stage to a terminal stage of the gas separation unit and isolating the third portion in the terminal stage. In certain embodiments, for example, the separation process may comprise recovering a quantity of a first product that comprises the isolated first portion and at least a portion of the captured quantity of the first component.

A. In certain embodiments, for example, the variable-concentration gas mixture may be formed by passing a uniform concentration gas mixture through a further gas separation unit. In certain embodiments, for example, the further gas separation unit may comprise a further gas separation media having a greater selectivity for the first component than for the second component.

B. In certain embodiments, for example, the separation process may comprise further capturing a further quantity of the first component via the intermediate gas separation media. In certain embodiments, for example, the separation process may comprise further recovering a quantity of an intermediate product that comprises the isolated second portion of the feed quantity and at least a portion of the further captured quantity. In certain embodiments, for example, the separation process may comprise recycling the quantity of the intermediate product into the further gas separation unit.

C. In certain embodiments, for example, the separation process may comprise recycling a portion of the first product to the initial stage. In certain embodiments, for example, the separation process may comprise responding to a change in a composition of the uniform concentration gas mixture by recycling a quantity of the isolated third portion of the feed quantity into the further gas separation unit.

D. In certain embodiments, for example, the initial gas separation media and the intermediate gas separation media comprise pelletized activated carbon. In certain embodiments, for example, the initial gas separation media and the intermediate gas separation media have a combined length-to-diameter ratio of at least 10:1 (for example in the range of between 15:1 and 30:1). In certain embodiments, for example, the initial gas separation media and the intermediate gas separation media have a combined length-to-diameter ratio of at least 2:1 (for example in the range of between 2:1 and 10:1, for example in the range of between 3:1 and 5:1, in the range of between 3:1 and 4:1, in the range of between 4:1 and 10:1, or the initial gas separation media and the intermediate gas separation media have a combined length-to-diameter ratio in the range of between 4:1 and 7:1).

E. In certain embodiments, for example, the first component is methane, the second component is nitrogen, and the combined concentrations of the methane and the nitrogen in the variable-concentration feed stream is in the range of between 90% and 99%.

F. In certain embodiments, for example, the isolated second portion of the feed quantity has an increase in concentration (for example a concentration gradient) of the second component along a direction in the intermediate stage that occurs at a rate per unit length at least 1.5 times (for example at least 2 times or at least 3 times) as great as (a) minus one, times (b) a time rate of the increase in the fed concentration of the second component that occurs during at least a part of the feeding, multiplied by (c) a cross-sectional area of the intermediate gas separation media, divided by (d) a volumetric flow rate at which the quantity of a variable-concentration gas mixture is fed into the gas separation unit.

G. In certain embodiments, for example, the isolating a first portion occurs after the passing and the further passing.

Certain embodiments may provide, for example, a process for removing a diluent from a feed gas to form a fuel product. In certain embodiments, for example, the process may comprise introducing a quantity of the feed gas through an inlet into a column of adsorbent to form a column of gas having a positive concentration gradient of the diluent extending downstream from the inlet. In certain embodiments, for example, the process may comprise withdrawing a terminal stream of gas from the column of adsorbent, followed by withdrawing an intermediate stream of gas from the column of adsorbent, followed by withdrawing an initial stream of gas from the column of adsorbent. In certain embodiments, for example, the process may comprise passing a portion of the terminal stream through an initial segment of adsorbent and an intermediate segment of adsorbent, followed by isolating the portion of the terminal stream in a terminal segment of adsorbent. In certain embodiments, for example, the process may comprise further passing a portion of the intermediate stream through the initial segment, followed by isolating the portion of the intermediate stream in the intermediate segment. In certain embodiments, for example, the process may comprise isolating the initial stream in the initial segment. In certain embodiments, for example, the process may comprise recovering a quantity of the fuel product from the initial segment, the quantity of the fuel product comprising at least a portion of the isolated initial stream. In certain embodiments, for example, the process may comprise recycling a quantity of an intermediate product into the column of adsorbent, the intermediate product comprising the isolated portion of the intermediate stream.

Certain embodiments may provide, for example, a process for removing a diluent from a feed gas to form a fuel product. In certain embodiments, for example, the process may comprise introducing a quantity of the feed gas through an inlet into a column of adsorbent to form a column of gas having a positive concentration gradient of the diluent extending downstream from the inlet. In certain embodiments, for example, the process may comprise withdrawing a terminal stream of gas from the column of adsorbent, followed by withdrawing an intermediate stream of gas from the column of adsorbent, followed by withdrawing an initial stream of gas from the column of adsorbent. In certain embodiments, for example, the process may comprise passing a portion of the terminal stream through an initial segment of adsorbent and an intermediate segment of adsorbent, followed by isolating the portion of the terminal stream in a terminal segment of adsorbent. In certain embodiments, for example, the process may comprise further passing a portion of the intermediate stream through the initial segment, followed by isolating the portion of the intermediate stream in the intermediate segment. In certain embodiments, for example, the process may comprise isolating the initial stream in the initial segment. In certain embodiments, for example, the process may comprise recovering a quantity of the fuel product from the initial segment, the quantity of the fuel product comprising at least a portion of the isolated initial stream.

Certain embodiments may provide, for example, a gas separation system. In certain embodiments, for example, the gas separation system may comprise a first unit operation configured to receive a feed gas. In certain embodiments, for example, the first unit operation may comprise a first vessel that contains a bed of gas separation media having a length-to-diameter ratio of at least 2:1 (for example in the range of 2:1 to 4:1). In certain embodiments, for example, the gas separation system may comprise a second unit operation. In certain embodiments, for example, the second unit operation may comprise an initial vessel containing an initial segment of gas separation media. In certain embodiments, for example, the second unit operation may comprise an intermediate vessel containing an intermediate segment of gas separation media. In certain embodiments, for example, the second unit operation may comprise a terminal vessel. In certain embodiments, for example, the second unit operation may comprise a first intermediate valve that controls fluid communication between the initial vessel and the intermediate vessel. In certain embodiments, for example, the second unit operation may comprise a second intermediate valve that controls fluid communication between the intermediate vessel and the terminal vessel. In certain embodiments, for example, the gas separation system may comprise a gas line connecting a gas output of the terminal vessel to an input to the first unit operation. In certain embodiments, for example, the gas separation system may comprise a control system configured to perform one or more of (a) recycling a portion of a product gas to the initial vessel while venting gas from the terminal vessel at a constant pressure and (b) reducing the volume of the terminal vessel (or example by switching to an alternative terminal vessel or adding/removing a supplemental terminal vessel).

A. In certain embodiments, for example, the bed of gas separation media is oriented to provide a vertical gas flow direction through the bed of gas separation media. In certain embodiments, for example, the gas separation system may comprise an inlet to the first vessel that is located at a bottom half of the first vessel. In certain embodiments, for example, the initial vessel, intermediate vessel, and terminal vessel are configured as a vertical series of tanks. In certain embodiments, for example, the initial vessel, intermediate vessel, and terminal vessel are connected by two 180-degree bends. In certain embodiments, for example, the initial vessel, intermediate vessel, and terminal vessel are connected by two 360-degree bends.

B. In certain embodiments, for example, a ratio of a volume of the initial vessel to a volume of the intermediate vessel is at least 4:1. In certain embodiments, for example, the bed of gas separation media has a length-to-diameter ratio of at least 10:1.

In certain embodiments, for example, a first gas inlet valve to the first vessel may have an inner diameter of at least 50% (for example at least 60%, at least 70%, at least 80%, or at least 90%) of a diameter of the bed of gas separation media. In certain embodiments, for example, a gas inlet valve to the initial vessel may have an inner diameter of at least 50% (for example at least 60%, at least 70%, at least 80%, or at least 90%) of a diameter of the initial segment of gas separation media. In certain embodiments, for example, the first inlet valve and the gas inlet valve may be sized to provide radial dispersion and/or plug flow in the bed of gas separation media and the initial segment of gas separation media, respectively.

In certain embodiments, for example, one or more of the first vessel, initial vessel, intermediate vessel, and terminal vessel may be shaped to provide a uniform superficial velocity in a length dimension of the respective tank.

C. In certain embodiments, for example, the gas separation system may comprise a vacuum pump. In certain embodiments, for example, the vacuum pump maybe selected to evacuate the one or more of the first vessel, initial vessel, intermediate vessel, and terminal vessel to a pressure in the range of between 0.01 PSIA and 5 PSIA, for example a pressure in the range of between 0.1 PSIA and 1 PSIA. In certain embodiments, for example, the vacuum pump maybe selected to evacuate the one or more of the first vessel, initial vessel, intermediate vessel, and terminal vessel may be exclusive of a gas diffuser.

In certain embodiments, for example, the gas separation system may comprise a temperature control subsystem. In certain embodiments, for example, the temperature control subsystem may comprise a cooling medium to remove heat from one or more of the initial vessel, intermediate vessel, and terminal vessel.

D. In certain embodiments, for example, the initial segment of adsorbent is a fixed bed. In certain embodiments, for example, the intermediate segment of adsorbent is a fixed bed.

E. In certain embodiments, for example, the recycling may be performed in response to one or more of a measurement that a concentration of a component in the feed gas has decreased, a measurement that a target concentration of the component in a gas product is below a predetermined concentration, a measurement that a volume of the gas product is above a predetermined volume, and a measurement that a target concentration of the component at an inlet to the terminal vessel is below a further predetermined target concentration.

In certain embodiments, for example, the reducing the volume of the terminal vessel may be performed in response to one or more of a measurement that a concentration of the component in the feed has increased, a measurement that a target concentration of the component in the gas product is above a predetermined concentration, and a measurement that a volume of the first gas product is below a predetermined volume.

Certain embodiments may provide, for example, a method and apparatus for measuring determining the shape of a concentration gradient in a length dimension of a quantity of adsorbent (for example along the length of a cylindrical bed of adsorbent). In certain embodiments, for example, the quantity of adsorbent may be separated into a series of segments, a gas mixture passed sequentially through the segments until the segments reach a target pressure (for example 1 bar), the segments isolated (for example by closing integral valves disposed between the segments), and each segment evacuated (for example down to 0.4 PSIG) and the contents of the segment measured (for example using a gas chromatograph). In certain embodiments, for example, the volume of gas recovered from each segment may be normalized and compared to the total volume of gas mixture input into the quantity of adsorbent in order to obtain a total recovery.

Certain embodiments may provide, for example, a process for generating one or more Renewable Identification Numbers (RINs) comprising any of the separation process, apparatus, and/or systems disclosed herein. Certain embodiments may provide, for example, a non-transitory computer readable medium storing instructions that, when executed by one or more computer processors, cause the one or more computer processors to implement control logic to implement the process for generating one or more RINs.

Certain embodiments may provide, for example, a method of trading one or more RINs may comprise any of the separation process, apparatus, and/or systems disclosed herein. Certain embodiments may provide, for example, a non-transitory computer readable medium storing instructions that, when executed by one or more computer processors, cause the one or more computer processors to implement the method of trading one or more RINs.

Certain embodiments may provide, for example, a separation process. In certain embodiments, for example, the separation process may comprise inputting a gas input stream into a volume until one or more predetermined criteria is met. In certain embodiments, for example, the gas input stream may have an input concentration profile. In certain embodiments, for example, the input concentration profile may comprise an increase in concentration of a component of the gas input stream during the inputting and a maximum input concentration of the component of the gas input stream. In certain embodiments, for example, the volume may contain plural elements that selectively adsorb the component and that restrict gas-phase mixing between a first location within the volume and a second location within the volume. In certain embodiments, for example, the separation process may comprise outputting a gas output stream from the volume. In certain embodiments, for example, the gas output stream may have an output concentration profile. In certain embodiments, for example, the output concentration profile may comprise a maximum output concentration that is greater than the maximum input concentration of the component.

A. In certain embodiments, for example, the gas input stream may be derived from (for example one or more portions of) an output gas stream of a nitrogen rejection unit (for example the tail gas from a nitrogen rejection unit). In certain embodiments, for example, the output gas stream of the nitrogen rejection unit may have a concentration profile comprising a decrease in concentration of the component. In certain embodiments, for example, the gas input stream to the volume is formed by providing a first portion of the output gas stream of the nitrogen rejection unit and a second portion of the output gas stream of the nitrogen rejection unit in reverse order to the order in which the first portion and the second portion were obtained from the nitrogen rejection unit.

In certain embodiments, for example, the gas input stream may comprise methane and nitrogen. In certain embodiments, for example, the gas input stream may comprise methane, nitrogen, and carbon dioxide. In certain embodiments, for example, the gas input stream may comprise methane, nitrogen, carbon dioxide, and oxygen. In certain embodiments, for example, the component may be methane.

B. In certain embodiments, the inputting comprises inputting a gas input stream into an initially partially evacuated volume until one or more predetermined criteria is met. In certain embodiments, for example, the initially partially evacuated volume may have a pressure of less than 5 PSIA. In certain embodiments, for example, the initially partially evacuated volume may have a pressure of less than 4 PSIA. In certain embodiments, for example, the initially partially evacuated volume may have a pressure of less than 3 PSIA. In certain embodiments, for example, the initially partially evacuated volume may have a pressure of less than 2 PSIA. In certain embodiments, for example, the initially partially evacuated volume may have a pressure of less than 1.5 PSIA. In certain embodiments, for example, the initially partially evacuated volume may have a pressure of less than 1.0 PSIA. In certain embodiments, for example, the initially partially evacuated volume may have a pressure of less than 0.5 PSIA. In certain embodiments, for example, the initially partially evacuated volume may have a pressure of less than 0.1 PSIA. In certain embodiments, for example, the initially partially evacuated volume may have a pressure of less than 0.01 PSIA.

C. In certain embodiments, for example, the one or more predetermined criteria may comprise a pressure within the volume. In certain embodiments, for example, the pressure within the volume may be in the range of between 6 PSIA and 200 PSIA, for example in the range of between 14.7 PSIA and 150 PSIA, in the range of between 30 PSIA and 100 PSIA, in the range of between 100 PSIA and 200 PSIA, in the range of between 50 PSIA and 150 PSIA, in the range of between 60 PSIA and 100 PSIA, or the pressure within the volume may be in the range of between 60 PSIA and 80 PSIA.

In certain embodiments, for example, the one or more predetermined criteria may comprise a target quantity of gas in the gas input stream. In certain embodiments, for example, the one or more predetermined criteria may comprise a target time for inputting the gas input stream into the volume.

D. In certain embodiments, for example, the plural elements may comprise plural adsorbent particles. In certain embodiments, for example, the plural elements (for example adsorbent particles) may selectively adsorb the component relative to a further component of the gas input stream. In certain embodiments, for example, the plural elements may comprise flow disrupting elements.

E. In certain embodiments, for example, the plural particles may form a packed bed in the volume. In certain embodiments, for example, gas flow through the packed bed may comprise plug flow. In certain embodiments, for example, the packed bed may have a void fraction in the range of between 1% and 40%, for example in the range of between 1% and 35%, in the range of between 1% and 30%, less than 25%, in the range of between 1% and 20%, in the range of between 1% and 15%, in the range of between 20% and 40% or the packed bed may have a void fraction in the range of between 1% and 10%.

F. In certain embodiments, for example, gas in the volume may not be completed mixed. In certain embodiments, for example, gas in the volume may have a gradient in concentration of the component.

G. In certain embodiments, for example, the gas output stream may have a gas output volume that comprises a first output volume having a concentration profile with a maximum first output component concentration that is less than or equal a maximum first output concentration. In certain embodiments, for example, the maximum first output concentration may be less than or equal to a maximum allowed flare concentration of the component. In certain embodiments, for example, the first output volume may have an average component concentration (for example when the gas in the first output volume is fully mixed and homogeneous in composition) that is less than or equal to a maximum allowed flare concentration of the component. In certain embodiments, for example, the gas output volume may comprise a second output volume having a concentration profile with a minimum second output component concentration that is greater than the maximum first output concentration and a maximum second output component concentration that is less than a minimum third output concentration. In certain embodiments, for example, gas output volume may comprise a third output volume having a concentration profile with a minimum third output component concentration that is greater than or equal to the minimum third output concentration. In certain embodiments, for example, the minimum third output concentration may be greater than or equal to a minimum product stream concentration of the component. In certain embodiments, for example, the third output volume may have an average component concentration (for example when the gas in the third output volume is fully mixed and homogeneous in composition) that is greater than or equal to a minimum product stream concentration of the component.

In certain embodiments, for example, the gas output stream may have a gas output volume that consists a first output volume having a concentration profile with a maximum first output component concentration that is less than or equal a maximum first output concentration; a second output volume having a concentration profile with a minimum second output component concentration that is greater than the maximum first output concentration and a maximum second output component concentration that is less than a minimum third output concentration; and a third output volume having a concentration profile with a minimum third output component concentration that is greater than or equal to the minimum third output concentration.

In certain embodiments, for example, the maximum first output concentration may be less than 20% and the minimum third output concentration is greater than 90%. In certain embodiments, for example, the maximum first output concentration may be less than 3% and the minimum third output concentration is greater than 97%.

In certain embodiments, for example, the maximum first output concentration may be less than 15%. In certain embodiments, for example, the maximum first output concentration may be less than 10%. In certain embodiments, for example, the maximum first output concentration may be less than 3%. In certain embodiments, for example, the maximum first output concentration may be less than 1%. In certain embodiments, for example, the minimum third output concentration may be greater than 95%. In certain embodiments, for example, the maximum first output concentration may be greater than 98%. In certain embodiments, for example, the maximum first output concentration may be greater than 99%.

In certain embodiments, for example, the ratio of the second output volume to the gas output volume may be less than 30%. In certain embodiments, for example, the ratio of the second output volume to the gas output volume may be less than 25%. In certain embodiments, for example, the ratio of the second output volume to the gas output volume may be less than 20%. In certain embodiments, for example, the ratio of the second output volume to the gas output volume may be less than 10%. In certain embodiments, for example, the ratio of the second output volume to the gas output volume may be less than 5%.

H. In certain embodiments, for example, the gas input stream may be formed from an output of a prior separation unit (for example the waste stream from a nitrogen rejection unit) by isolating a first portion of the prior unit gas output stream corresponding to a first continuous portion of the prior unit output concentration profile in a first volume and a second portion of the prior unit gas output stream corresponding to a second continuous portion of the prior unit output concentration profile in a second volume, the first portion of the prior unit gas output stream having an average concentration of the component that is greater than the average concentration of the component in the second volume. In certain embodiments, for example, the inputting gas input stream may comprise feeding the isolated first portion of the prior unit gas output stream into the volume, followed by feeding the isolated second portion of the prior unit gas output stream into the volume.

I. In certain embodiments, for example, the separation process may further comprise isolating a first portion of the gas output stream corresponding to a first continuous portion of the output concentration profile in a first volume and a second portion of the gas output stream corresponding to a second continuous portion of the output concentration profile in a second volume, the first portion of the gas output stream having an average concentration of the component that is greater than the average concentration of the component in the second volume. In certain embodiments, for example, the separation process may further comprise feeding the isolated first portion of the gas output stream into a further volume that is partially evacuated, the further volume containing further plural elements that selectively adsorb the component and that restrict gas-phase mixing between a first location within the further volume and a second location within the further volume; followed by feeding the isolated second portion of the gas output stream into the further volume.

J. In certain embodiments, for example, the gas input stream may be formed by injecting a further component (for example where the component is methane and the further component is nitrogen) into a feed gas prior to the inputting the gas input stream. In certain embodiments, for example, the injecting the further component into the feed gas modifies a feed gas concentration profile of the component in the feed gas. In certain embodiments, for example, the feed gas concentration profile of the component in the feed gas prior to the injecting may be a constant concentration. In certain embodiments, for example, the feed gas concentration profile of the component in the feed gas prior to the injecting may be a concentration gradient. In certain embodiments, for example, the feed gas concentration profile of the component in the feed gas prior to the injecting may be a constant concentration. In certain embodiments, for example, the feed gas concentration profile of the component in the feed gas prior to the injecting may be a concentration gradient. wherein the further component may be a recycle stream (for example a recycle stream obtained from a nitrogen-rich flare gas stream) from a separation unit. In certain embodiments, for example, the feed gas may comprise approximately equal concentrations of nitrogen and methane (for example a 50/50 mix).

In certain embodiments, for example, the gas input stream may be formed by injecting the component (for example where the component is methane) into a feed gas prior to the inputting the gas input stream. In certain embodiments, for example, the injecting the component into the feed gas modifies a feed gas concentration profile of the component in the feed gas. In certain embodiments, for example, the feed gas concentration profile of the component in the feed gas prior to the injecting may be a constant concentration. In certain embodiments, for example, the feed gas concentration profile of the component in the feed gas prior to the injecting may be a concentration gradient. In certain embodiments, for example, the injection may have an injection profile comprising (a) injecting the further component at an initial further component rate followed by decreasing the further component injection rate followed (b) injecting the component at an initial component rate followed decreasing the component injection rate. In certain embodiments, for example, the injecting the further component may taper to a further component injection rate of zero before the injecting the component.

Certain embodiments may provide, for example, a separation process. In certain embodiments, for example, the separation process may comprise inputting a gas component (for example a component consisting of methane in a gas input stream comprising methane and nitrogen or methane, nitrogen and carbon dioxide) into a vessel (for example a vessel initially under a partial vacuum) through a first opening defined by the vessel until one or more predetermined criteria is met (for example until the pressure of the vessel reaches a predetermined target pressure), the vessel containing plural elements that have an affinity to adsorb the gas component and that restrict gas-phase mixing between the first opening of the vessel and a second opening of the vessel. In certain embodiments, for example, the separation process may comprise withdrawing at least a portion of the gas component from the vessel through the second opening (for example an outlet of the vessel from which product is obtained) of the vessel (for example by closing the first opening, opening the second opening, and pulling a partial vacuum on the vessel through the second opening). In certain embodiments, for example, the separation process may comprise reducing a quantity of the gas component proximate the second opening by passing a further gas component into the vessel through the second opening while maintaining the vessel under a partial vacuum and withdrawing at least a portion of further gas component from the vessel after having passed through the vessel, the affinity of the plural elements to adsorb the further gas component being lower than the affinity of the plural elements to adsorb the gas component.

A. In certain embodiments, for example, at least a portion of the input gas component be present in a gas input stream. In certain embodiments, for example, at least a portion of the gas input stream may be an output stream (for example a waste stream) from a nitrogen rejection unit. In certain embodiments, for example, at least a portion of the gas input stream may be a feed gas stream to the nitrogen rejection unit. In certain embodiments, for example, the gas input stream may comprise a portion of the output stream followed by a portion of the feed gas stream.

Certain embodiments may provide, for example, a separation process. In certain embodiments, for example, the separation process may comprise inputting a gas component into a vessel through a first opening defined by the vessel until one or more predetermined criteria is met, the vessel containing plural elements that have an affinity to adsorb the gas component and that restrict gas-phase mixing between the first opening of the vessel and a second opening of the vessel. In certain embodiments, for example, the separation process may comprise withdrawing at least a portion of the gas component from the vessel through the second opening of the vessel (for example by closing the first opening, opening the second opening, and pulling a partial vacuum on the vessel through the second opening). In certain embodiments, for example, the separation process may comprise reducing a quantity of the gas component proximate the second opening by passing a further gas component into the vessel through the second opening while increasing pressure in the vessel, the affinity of the plural elements to adsorb the further gas component being lower than the affinity of the plural elements to adsorb the gas component.

Certain embodiments may provide, for example, a separation process, comprising: (i) feeding a quantity of a variable-concentration gas mixture into a gas separation unit at a fed concentration of a first component that is monotonically non-decreasing and that increases during at least part of the feeding and at a fed concentration of a second component that is monotonically non-increasing and that decreases during at least part of the feeding; (ii) introducing the fed quantity to an initial stage of the gas separation unit and isolating a first portion of the feed quantity in the initial stage, the initial stage comprising an initial gas separation media having a greater selectivity for the first component than for the second component; (iii) capturing a quantity of the first component via the initial gas separation media; (iv) passing a second portion of the fed quantity from the initial stage to an intermediate stage of the gas separation unit and isolating the second portion in the intermediate stage, the intermediate stage comprising an intermediate gas separation media having a greater selectivity for the first component than for the second component; (v) further passing a third portion of the fed quantity from the intermediate stage to a terminal stage of the gas separation unit and isolating the third portion in the terminal stage; and (vi) recovering a quantity of a first product that comprises the isolated first portion and at least a portion of the captured quantity of the first component. In certain embodiments, for example, the separation process may comprise (i) further capturing a further quantity of the first component via the intermediate gas separation media; (ii) further recovering a quantity of an intermediate product that comprises the isolated second portion of the feed quantity and at least a portion of the further captured quantity; and (iii) recycling the quantity of the intermediate product into the further gas separation unit.

Certain embodiments may provide, for example, a process for removing a diluent from a feed gas to form a fuel product, comprising: (i) introducing a quantity of the feed gas through an inlet into a column of adsorbent to form a column of gas having a positive concentration gradient of the diluent extending downstream from the inlet; (ii) withdrawing a terminal stream of gas from the column of adsorbent, followed by withdrawing an intermediate stream of gas from the column of adsorbent, followed by withdrawing an initial stream of gas from the column of adsorbent; (iii) passing a portion of the terminal stream through an initial segment of adsorbent and an intermediate segment of adsorbent, followed by isolating the portion of the terminal stream in a terminal segment of adsorbent; (iv) further passing a portion of the intermediate stream through the initial segment, followed by isolating the portion of the intermediate stream in the intermediate segment; (v) isolating the initial stream in the initial segment; (vi) recovering a quantity of the fuel product from the initial segment, the quantity of the fuel product comprising at least a portion of the isolated initial stream; and (vii) recycling a quantity of an intermediate product into the column of adsorbent, the intermediate product comprising the isolated portion of the intermediate stream.

Certain embodiments may provide, for example, a process for removing a diluent from a feed gas to form a fuel product, comprising: (i) introducing a quantity of the feed gas through an inlet into a column of adsorbent to form a column of gas having a positive concentration gradient of the diluent extending downstream from the inlet; (ii) withdrawing a terminal stream of gas from the column of adsorbent, followed by withdrawing an intermediate stream of gas from the column of adsorbent, followed by withdrawing an initial stream of gas from the column of adsorbent; (iii) passing a portion of the terminal stream through an initial segment of adsorbent and an intermediate segment of adsorbent, followed by isolating the portion of the terminal stream in a terminal segment of adsorbent; (iv) further passing a portion of the intermediate stream through the initial segment, followed by isolating the portion of the intermediate stream in the intermediate segment; (v) isolating the initial stream in the initial segment; (vi) recovering a quantity of the fuel product from the initial segment, the quantity of the fuel product comprising at least a portion of the isolated initial stream; and (vii) responding to a change in a composition of the feed gas by recycling a quantity of a depleted feed gas into the column of adsorbent, the depleted feed gas comprising the isolated portion of the terminal stream.

Certain embodiments may provide, for example, a gas separation system, comprising: (i) a first unit operation configured to receive a feed gas, comprising: a first vessel that contains a bed of gas separation media having a length-to-diameter ratio of at least 10:1; (ii) a second unit operation, comprising: (a) an initial vessel containing an initial segment of gas separation media; (b) an intermediate vessel containing an intermediate segment of gas separation media; and (c) a terminal vessel; (d) a first intermediate valve that controls fluid communication between the initial vessel and the intermediate vessel; and (e) a second intermediate valve that controls fluid communication between the intermediate vessel and the terminal vessel; (iii) a gas line connecting a gas output of the terminal vessel to an input to the first unit operation; and (iv) one or more of (a) recycling a portion of a product gas to the initial vessel while venting gas from the terminal vessel at a constant pressure and (b) reducing the volume of the terminal vessel (or example by switching to an alternative terminal vessel or adding/removing a supplemental terminal vessel).

Certain embodiments may provide, for example, a method for enriching a gas mixture. In certain embodiments, for example, the method may comprise introducing a first quantity of a gas mixture (for example a biogas comprising methane and nitrogen) into a unit operation that contains an bed (for example an elongated cylindrical bed contained in a tubular vessel) of gas separation media (for example pelletized activated carbon) having a length-to-diameter ratio of at least 2:1, at least 4:1, at least 15:1, or in the range of 1.8:1 and 4.2:1. In certain embodiments, for example, the method may comprise passing the first quantity through the length of the bed to partially saturate the bed and form a depleted gas mixture. In certain embodiments, for example, the method may comprise withdrawing the depleted gas mixture (for example a gas mixture with a reduced concentration of methane compared to nitrogen) from the unit operation. In certain embodiments, for example, the method may comprise further introducing a second quantity of the gas mixture into the bed to form a saturated bed. In certain embodiments, for example, the method may comprise reducing pressure in the saturated bed to obtain a regenerated bed and a desorbed gas component (for example a desorbed gas component with a high concentration of methane). In certain embodiments, for example, the method may comprise further withdrawing the second quantity of the gas mixture together with the desorbed gas component from the unit operation to obtain an enriched gas mixture.

Certain embodiments may provide, for example, a separation apparatus, comprising: (i) a plurality of segments that contain a quantity of adsorbent, the plurality of segments configurable to distribute a gas mixture via fluid communication that comprises fluid communication between a first segment of the plurality of segments and a second segment of the plurality of segments; (ii) a plurality of valves configured to receive a signal to isolate the first segment; (iii) a vacuum pump configured to pump gas out of the first segment and to pump gas out of the second segment; and (iv) a valve of the plurality of valves configured to open to place the first segment in fluid communication with the vacuum pump after the second segment has been partially evacuated.

Certain embodiments may provide, for example, a separation process, comprising: (i) providing a mixed gas feed stream to a separation unit, the mixed gas feed stream comprising a plurality of input concentrations of a component into the separation unit, the separation unit comprising a series of segments, the series of segments comprising: (a) a first adsorbent-containing segment configured to receive the mixed gas feed stream; (b) a second adsorbent-containing segment in fluid communication with the first adsorbent-containing segment; and (c) a third segment in fluid communication with the second adsorbent-containing segment; (ii) interrupting fluid communication between the first adsorbent-containing segment, the second adsorbent-containing segment, and the third segment; and (iii) recovering a first gas product from the first adsorbent-containing segment, a second gas product the second adsorbent-containing segment, and a third gas product from the third segment.

A. In certain embodiments, for example, the component may be nonuniformly adsorbed in the first adsorbent-containing segment and the second adsorbent-containing segment. In certain embodiments, for example, the first adsorbent-containing segment may comprise a vertical elongated vessel configured to receive the mixed gas stream through a bottom inlet or a top inlet.

B. In certain embodiments, for example, the separation process may comprise recycling a portion of the first gas product into the separation unit. In certain embodiments, for example, the recycling may be performed in response to detecting a change in composition of one or more of the first gas product, the second gas product, and the third gas product. In certain embodiments, for example, the recycling may be performed in response to detecting a change in one or plural temperatures in the separation unit. In certain embodiments, for example, the recycled portion of the first gas product may have a concentration profile of the component that comprises an initial concentration of the component in an initial portion of the first gas product recycled into the separation unit and a different concentration (for example a higher concentration than the initial concentration) when a subsequent portion (i.e. a portion occurring later in time than the initial portion) of the first gas product is recycled into the separation unit.

C. In certain embodiments, for example, the separation process may comprise recycling a portion of the second gas product into the separation unit. In certain embodiments, for example, the recycling may be performed in response to detecting a change in composition of one or more of the second gas product, the second gas product, and the third gas product. In certain embodiments, for example, the recycling may be performed in response to detecting a change in one or plural temperatures in the separation unit. In certain embodiments, for example, the recycled portion of the second gas product may have a concentration profile of the component that comprises an initial concentration of the component in an initial portion of the second gas product recycled into the separation unit and a different concentration (for example a higher concentration than the initial concentration) when a subsequent portion (i.e. a portion occurring later in time than the initial portion) of the second gas product is recycled into the separation unit.

D. In certain embodiments, for example, the separation process may comprise changing a volume of the third segment. In certain embodiments, for example, the changing may be performed in response to detecting a change in composition of one or more of the first gas product, the second gas product, and the third gas product. In certain embodiments, for example, the changing may be performed in response to detecting a change in one or plural temperatures in the separation unit.

E. In certain embodiments, for example, the separation unit may comprise a Nitrogen Removal Unit. In certain embodiments, for example, the mixed gas feed stream may be a biogas that comprises Methane and Nitrogen. In certain embodiments, for example, the adsorbent may comprise a pelletized activated carbon. In certain embodiments, for example, the first gas product may comprise greater than 95% Methane. In certain embodiments, for example, the first gas product may be input into a gas distribution network. In certain embodiments, for example, the third gas product may be sent to flare. In certain embodiments, for example, the third gas product may be vented to the atmosphere. In certain embodiments, for example, the third gas product may comprise greater than 95% Nitrogen.

F. In certain embodiments, for example, the separation process may further comprise generating a Renewable Identification Number associated with the first gas product. In certain embodiments, for example, the separation process may further comprise trading a Renewable Identification Number associated with the first gas product. In certain embodiments, for example, the separation process may further comprise entering a renewable energy contract associated with the first gas product.

G. In certain embodiments, for example, providing a mixed gas feed stream may comprise: (i) inputting a gas mixture into an elongated bed of adsorbent; (ii) exposing the elongated bed of adsorbent to a partial vacuum before the gas mixture becomes uniformly mixed throughout the elongated bed of adsorbent; and (iii) compressing a gas output of the vacuum pump to form the mixed gas feed stream. In certain embodiments, for example, the elongated bed may have a length-to-diameter ratio of at least 14:1. In certain embodiments, for example, the separation process may further comprise inputting the second gas product into the elongated bed of adsorbent.

Certain embodiments may provide, for example, a non-transitory computer readable medium storing instructions that, when executed by one or more computer processors, cause the one or more computer processors to implement any for the systems, apparatus, methods, or processes disclosed herein.

Certain embodiments may provide, for example, a separation process, comprising: inputting a gas input stream into a volume until one or more predetermined criteria is met, the gas input stream having a input concentration profile comprising an increase in concentration of a component of the gas input stream during the inputting and a maximum input concentration of the component of the gas input stream, the volume containing plural elements that selectively adsorb the component and that restrict gas-phase mixing between a first location within the volume and a second location within the volume; and outputting a gas output stream from the volume, the gas output stream having an output concentration profile comprising a maximum output concentration that is greater than the maximum input concentration of the component.

Certain embodiments may provide, for example, a separation process, comprising: inputting a gas input stream into a volume until one or more predetermined criteria is met, the gas input stream having a input concentration profile comprising an increase in concentration of a component of the gas input stream during the inputting and a maximum input concentration of the component of the gas input stream, the volume containing plural elements that selectively adsorb the component and that restrict gas-phase mixing between a first location within the volume and a second location within the volume; outputting a gas output stream from the volume, the gas output stream having an output concentration profile comprising a maximum output concentration that is greater than the maximum input concentration of the component; isolating a first portion of the gas output stream corresponding to a first continuous portion of the output concentration profile in a first volume and a second portion of the gas output stream corresponding to a second continuous portion of the output concentration profile in a second volume, the first portion of the gas output stream having an average concentration of the component that is greater than the average concentration of the component in the second volume; feeding the isolated first portion of the gas output stream into a further volume that is partially evacuated, the further volume containing further plural elements that selectively adsorb the component and that restrict gas-phase mixing between a first location within the further volume and a second location within the further volume; followed by feeding the isolated second portion of the gas output stream into the further volume.

Certain embodiments may provide, for example, a separation process, comprising: inputting a gas input stream into a volume until one or more predetermined criteria is met, the gas input stream having a input concentration profile comprising an increase in concentration of a component of the gas input stream during the inputting and a maximum input concentration of the component of the gas input stream, the volume containing plural elements that selectively adsorb the component and that restrict gas-phase mixing between a first location within the volume and a second location within the volume; and outputting a gas output stream from the volume, the gas output stream having an output concentration profile comprising a maximum output concentration that is greater than the maximum input concentration of the component, wherein the gas input stream is formed from an output of a prior separation unit (for example a nitrogen rejection unit such as a tail gas nitrogen rejection unit) by isolating a first portion of the prior unit gas output stream corresponding to a first continuous portion of the prior unit output concentration profile in a first volume and a second portion of the prior unit gas output stream corresponding to a second continuous portion of the prior unit output concentration profile in a second volume, the first portion of the prior unit gas output stream having an average concentration of the component that is greater than the average concentration of the component in the second volume; and the inputting the gas input stream comprises feeding the isolated first portion of the prior unit gas output stream into the volume, followed by feeding the isolated second portion of the prior unit gas output stream into the volume A. In certain embodiments, for example, the separation process may further comprise isolating a first portion of the gas output stream corresponding to a first continuous portion of the output concentration profile in a first volume and a second portion of the gas output stream corresponding to a second continuous portion of the output concentration profile in a second volume, the first portion of the gas output stream having an average concentration of the component that is greater than the average concentration of the component in the second volume. In certain embodiments, for example, the separation process may further comprise feeding the isolated first portion of the gas output stream into a further volume that is partially evacuated, the further volume containing further plural elements that selectively adsorb the component and that restrict gas-phase mixing between a first location within the further volume and a second location within the further volume; followed by feeding the isolated second portion of the gas output stream into the further volume.

Certain embodiments may comprise, for example, a separation process comprising: inputting a gas component into a vessel through a first opening defined by the vessel until one or more predetermined criteria is met, the vessel containing plural elements that have an affinity to adsorb the gas component and that restrict gas-phase mixing between the first opening of the vessel and a second opening of the vessel; and withdrawing at least a portion of the gas component from the vessel through the second opening of the vessel.

Certain embodiments may provide, for example, a separation process, comprising: inputting a gas component into a vessel through a first opening defined by the vessel until one or more predetermined criteria is met, the vessel containing plural elements that have an affinity to adsorb the gas component and that restrict gas-phase mixing between the first opening of the vessel and a second opening of the vessel; withdrawing at least a portion of the gas component from the vessel through the second opening of the vessel (for example by closing the first opening, opening the second opening, and pulling a partial vacuum on the vessel through the second opening); and reducing a quantity of the gas component proximate the second opening by passing a further gas component into the vessel through the second opening while maintaining the vessel under a partial vacuum and withdrawing at least a portion of further gas component from the vessel after having passed through the vessel, the affinity of the plural elements to adsorb the further gas component being lower than the affinity of the plural elements to adsorb the gas component.

Certain embodiments may provide, for example, a separation process, comprising: inputting a gas component into a vessel through a first opening defined by the vessel until one or more predetermined criteria is met, the vessel containing plural elements that have an affinity to adsorb the gas component and that restrict gas-phase mixing between the first opening of the vessel and a second opening of the vessel; withdrawing at least a portion of the gas component from the vessel through the second opening of the vessel (for example by closing the first opening, opening the second opening, and pulling a partial vacuum on the vessel through the second opening); and reducing a quantity of the gas component proximate the second opening by passing a further gas component into the vessel through the second opening while increasing pressure in the vessel, the affinity of the plural elements to adsorb the further gas component being lower than the affinity of the plural elements to adsorb the gas component.

Certain embodiments may provide, for example, a separation process, comprising: inputting a gas component into a vessel through a first opening defined by the vessel until one or more predetermined criteria is met, the vessel containing plural elements that have an affinity to adsorb the gas component and that restrict gas-phase mixing between the first opening of the vessel and a second opening of the vessel; withdrawing at least a portion of the gas component from the vessel through the second opening of the vessel (for example by closing the first opening, opening the second opening, and pulling a partial vacuum on the vessel through the second opening); (1) reducing a quantity of the gas component proximate the second opening by passing a further gas component into the vessel through the second opening while maintaining the vessel under a partial vacuum and withdrawing at least a portion of further gas component from the vessel after having passed through the vessel, the affinity of the plural elements to adsorb the further gas component being lower than the affinity of the plural elements to adsorb the gas component; followed by (2) further reducing a quantity of the gas component proximate the second opening by passing a further gas component into the vessel through the second opening while increasing pressure in the vessel, the affinity of the plural elements to adsorb the further gas component being lower than the affinity of the plural elements to adsorb the gas component. In certain embodiments, for example, the withdrawn at least a portion of the gas component is present in an output gas stream, wherein at least 20% (for example at least 30%, at least 40%, or at least 45%) of output gas stream comprises a product portion having a component concentration of at least 90% (for example at least 98%). In certain embodiments, for example, the product portion having a component concentration of at least 90% (for example at least 98%) increases from 10% of the output gas stream to at least 40% of the output gas stream as a result of a previous reducing corresponding to step 1 and a previous further reducing corresponding to step 2.

DETAILED DESCRIPTION

Figure 1:
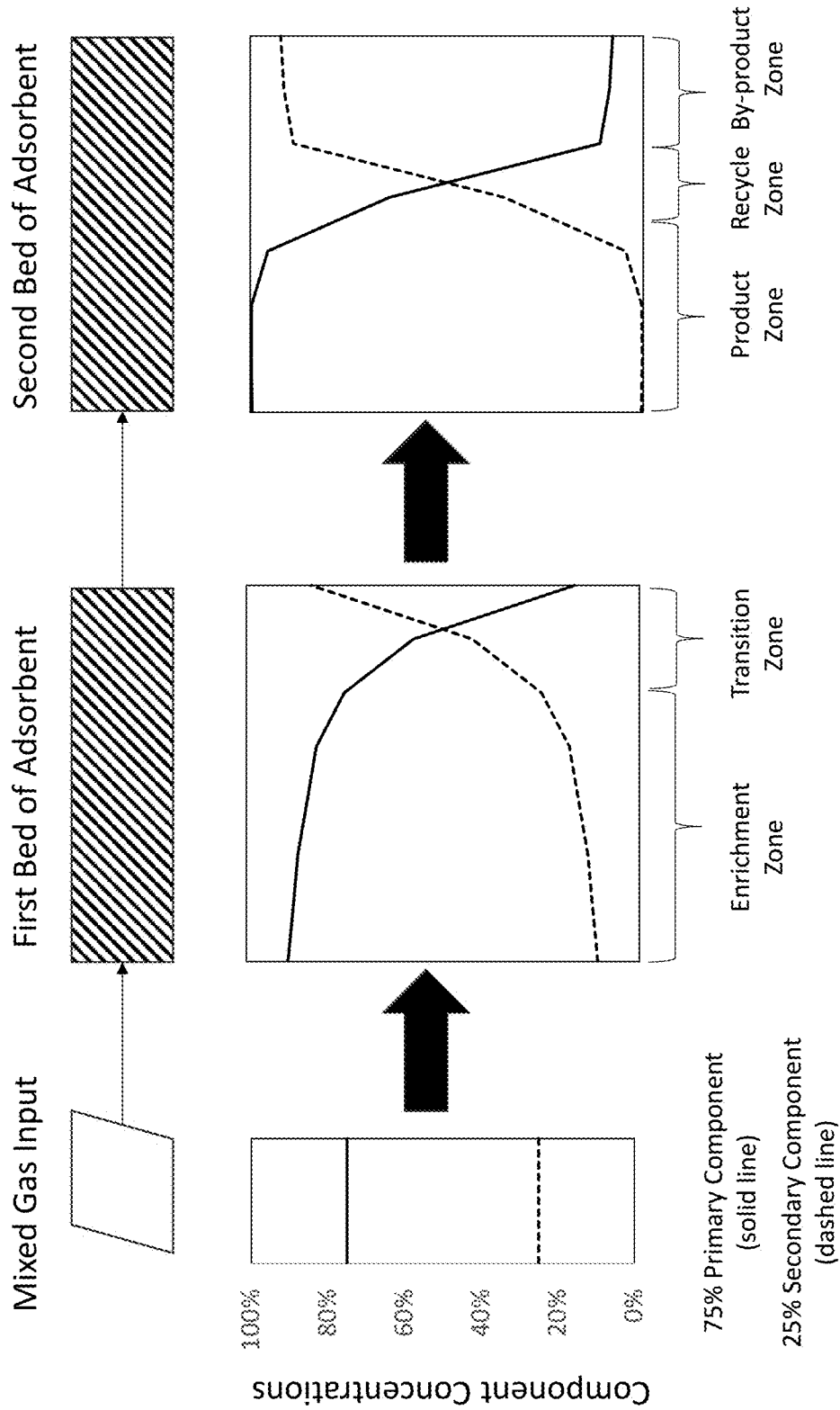
FIG. 1 schematically depicts an aspect of the present disclosure.
Figure 2:
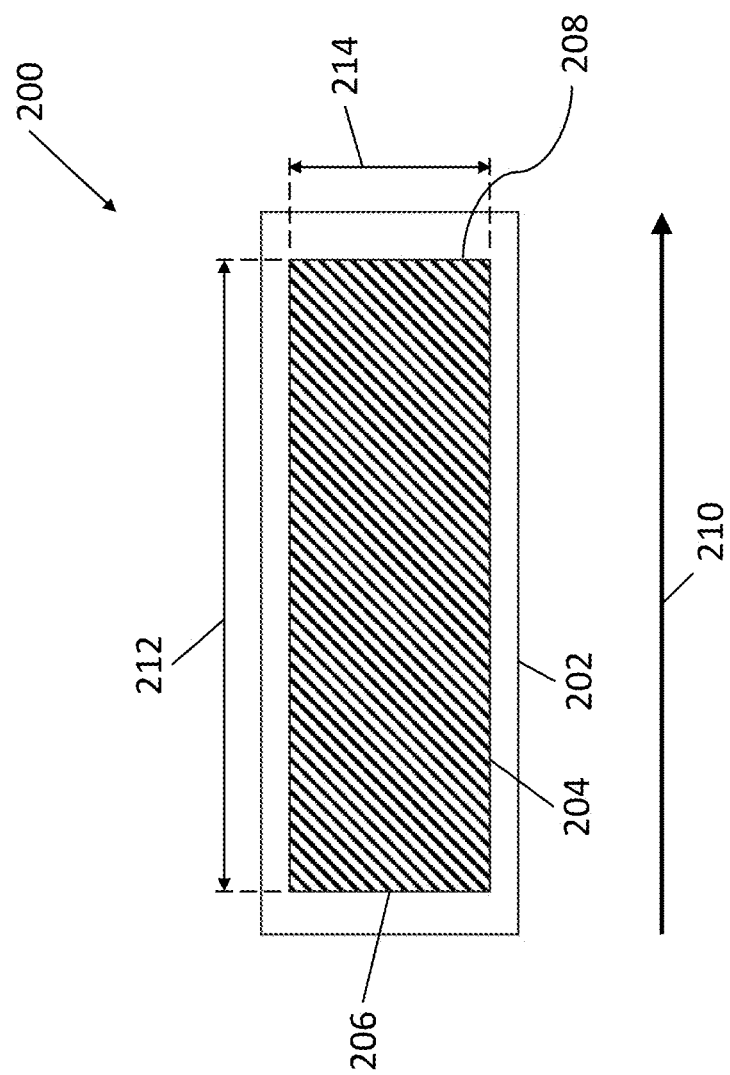
FIG. 2 shows a schematic depiction of a gas separation unit containing a bed of gas separation media.

FIG. 2 shows an apparatus 200 comprising a vessel 202 and a bed of gas separation media 204 that is contained within the vessel 202. The vessel is configured to receive a gas (for example a gas mixture containing nitrogen and methane) at a first end 206 and to deliver a gas from a second end 208 in the direction indicated by the arrow 210. The orientation of the vessel 202 and bed 204 can be vertical, diagonal, or horizontal and the direction of the arrow 210 (and hence the general direction of gas flow) can be horizontal, upward pointing, or downward pointing (relative to direction of gravity or other frame of reference, for example). For example, the vessel 202, first end 206, second end 208, and bed 204 can be oriented such that gas enters the vessel 202 at the bottom of the vessel and flows upward such that a gas is delivered from the top of the vessel. Alternatively, the vessel 202, first end 206, second end 208, and bed 204 can be oriented such that gas enters the vessel 202 at the top of the vessel and flows downward such that a gas is delivered from the top of the vessel. In addition, multiple such vessels can be operated in series in which a first vessel receives a gas from the bottom of the vessel and outputs it via piping to the top of second vessel (or vice versa). Such a cooperative configuration of vessels may be employed, for example, to reduce the length of plumbing between multiple such vessels operated in series.

The bed of gas separation media 204 has a characteristic length 212 and characteristic width 214. The characteristic width 214 can be a diameter if the bed 204 is cylindrical, a width if the bed has a square cross-section, or any other appropriate characteristic measurement of the dimension of the cross-section of the bed as the case may be. The bed 204 has a characteristic length-to-width ratio defined as the length 212 divided by the width 214. The characteristic length-to-width ratio can be any desired ratio. For example, the length-to-width ratio can be at least 1:1, at least 1.5:1, at least 2:1, at least 3:1, at least 3.5:1, at least 4:1, at least 5:1, at least 7:1, at least 10:1, at least 14:1, at least 20:1, at least 25:1, at least 30:1, at least 40:1, or at least 50:1. For example, the length-to-width ratio can be in the range of between 3:1 and 50:1, for example in the range of between 1:1 and 3:1, in the range of between 1.5:1 and 2.5:1, in the range of between 2.5:1 and 3.5:1, in the range of between 3.5:1 and 4.5:1, in the range of between 5:1 and 30:1, in the range of between 5:1 and 15:1, in the range of between 10:1 and 20:1, in the range of between 14:1 and 20:1, in the range of between 20:1 and 30:1, in the range of between 24:1 and 30:1, in the range of between 25:1 and 35:1, or in the range of between 14:1 and 28:1.

The gas separation media in the bed 204 can be a solid, a liquid, or a combination of the two. Suitable gas separation media can comprise a powder, a pellet, a membrane, a solid affixed to a structure (for example a ceramic or metal structure such as an inert packing material with a solid adsorbent material attached thereto). The bed 204 can comprise a solid gas separation media packed into the vessel 202. For example, the bed 204 can occupy a volume defined by an inner wall of the vessel 202 and a pair of separators at either end of the bed. A suitable separator includes a perforated plate. The perforated plate can be held in place perforated plate assembly. The perforated plate assembly can be removable, for example by a key design that allows for removal of the perforated plate. The ability to remove one or both perforated plates simplifies repacking of the bed 202.

As noted above, the gas separation media can comprise an adsorbent material, such as an adsorbent material that selectively adsorbs a first gas relative to a second gas. For example, an adsorbent material can be selected that preferentially adsorbs methane compared to nitrogen. Suitable adsorbent materials include activated carbon, for example Cabot® RB3 activated carbon in the form of pellets. The adsorbent material can also be a loose (or supported) powder or flake.

The adsorbent material can also be a zeolite, a silica (for example silica gel), etc. or any other adsorbent material known to a person of ordinary skill in the technical field.

Mixed gas separations can include separation of nitrogen from methane (for example removal of a portion of the nitrogen present in a biogas). Mixed gas separations can include separation of carbon dioxide and/or oxygen from a mixed gas, or any other mixed gas separation known to a person of ordinary skill in the field.

Figure 3:
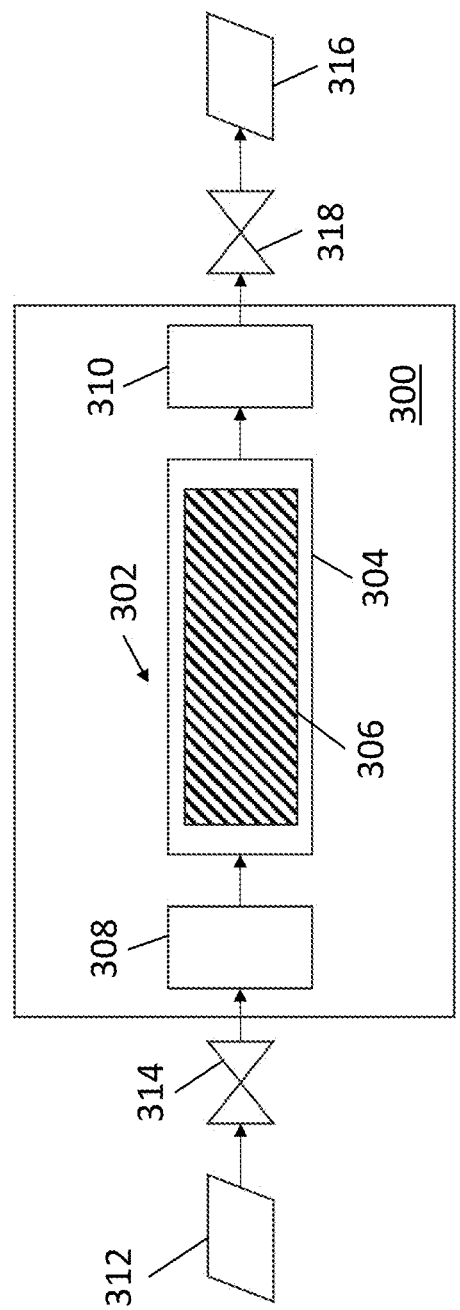
FIG. 3 shows a schematic depiction of a unit operation comprising a gas separation unit.

FIG. 3 shows a unit operation 300 comprising a gas separation unit 302 (which includes a vessel 304 and a bed of gas separation media 306 contained in the vessel 304), an inlet 308 to the gas separation unit 302, and a gas outlet 310 from the gas separation unit 302.

In a mode of operation, unit operation 300 can be evacuated (for example down to a pressure in the range of between 0.01 PSIA and 14 PSIA, for example in the range of between 8 PSIA and 14 PSIA, in the range of between 8 PSIA and 12 PSIA, in the range of between 0.01 PSIA and 1 PSIA, or down to a pressure in the range of between 0.1 PSIA and 5 PSIA) and then feed gas 312 charged into the vessel 304 through inlet 308 (and undergoing plug flow or near plug flow downstream of the inlet 308 through the bed of separation media 306) until a target pressure is reached in the vessel 304 or until a designated quantity of feed gas 312 has been introduced, at which point feed gas inlet value 314 is closed. During period in which the feed gas 312 is being introduced to the unit operation 300, a gas product outlet valve 318 is in a closed position.

In order to obtain a gas product 316 from the unit operation 300, gas product outlet valve 318 is opened and the vessel 304 evacuated and the evacuated gas (including that was gas present in the vessel 304 and desorption product from the bed of gas separation media 306) exits via outlet 310 and is compressed to obtain gas product 316. The gas product 316 can be obtained as a variable concentration stream for use in a subsequent stage of gas separation.

The above-described process can be repeated any number of desired times to recover a series of gas product 316 quantities. The gas separation unit 302 can be prepared for a repetition of the process by evacuating it and closing inlet valve 314 and gas product outlet valve 318. An exemplary process design for disclosed mode of operation is summarized in Table 1:

TABLE 1

| Period | Starting State of Vessel 304 | Inlet Valve 314 | Gas Product Outlet Valve 318 | Ending State of Vessel 304 |
| --- | --- | --- | --- | --- |
| 0 | Evacuated | Closed | Closed | Evacuated |
| 1 | Feed gas 312 introduced | Open | Closed | Charged with feed gas 312 at target pressure |

TABLE 1-continued

| Period | Starting State of Vessel 304 | Inlet Valve 314 | Gas Product Outlet Valve 318 | Ending State of Vessel 304 |
|---|---|---|---|---|
| 3 | Charged feed gas 312 isolated in gas separation unit 302 | Closed | Closed | Charged feed gas 312 isolated in gas separation unit 302 |
| 4 | Exposed to vacuum via gas product outlet valve 318 | Closed | Open | Evacuated |

Figure 4:
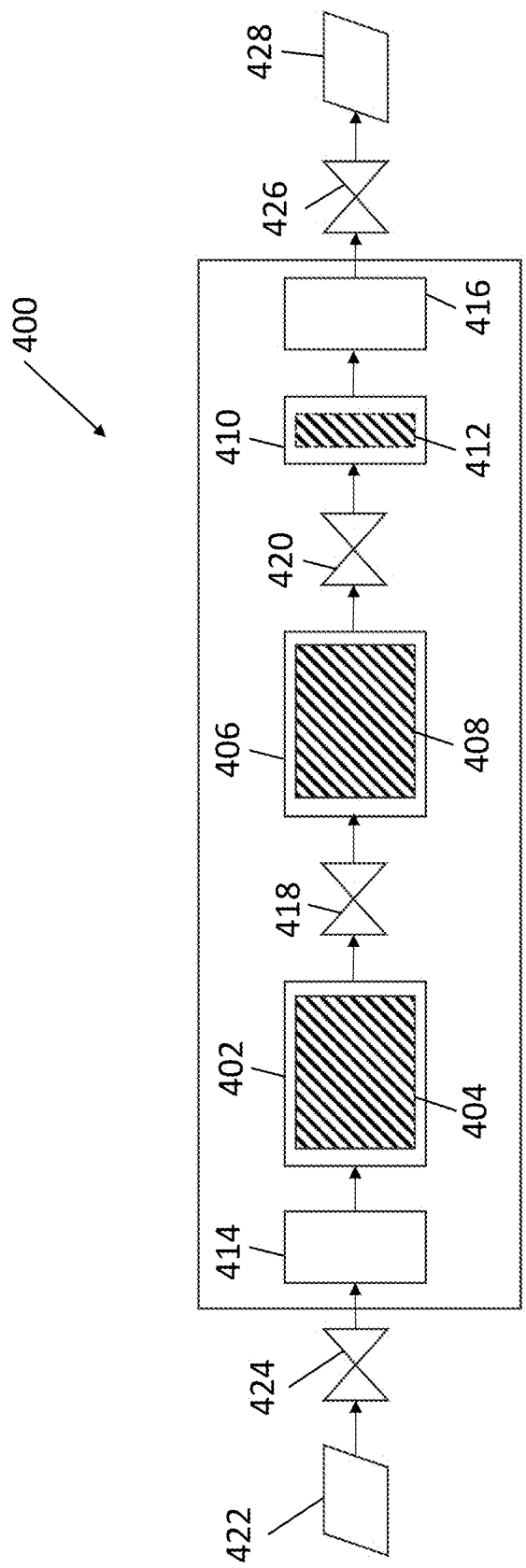
FIG. 4 shows a schematic depiction of a unit operation comprising a three-segment gas separation unit.

FIG. 4 shows a unit operation 400 comprising initial vessel 402 and initial segment of gas separation media 404 that is contained in the initial vessel 402; an intermediate vessel 406 and an intermediate segment of gas separation media 408 that is contained in the intermediate vessel 406; and a terminal vessel 410 and an optional terminal segment of gas separation media 412 that is contained in the terminal vessel 410.

Unit operation 400 further comprises an inlet 414 to the initial vessel 402 and an outlet 416 from the terminal vessel 410. The initial vessel 402 and the intermediate vessel 406 can be brought into fluid communication by opening a first valve 418 interposed therebetween. The intermediate vessel 406 and the terminal vessel 408 can be brought into fluid communication by opening valve 420 interposed therebetween.

As an extension of the explanation provided above with reference to FIG. 2, the initial segment of gas separation media 404, intermediate segment of gas separation media 408, and optional terminal segment of gas separation media 412, alone or in combination of two or more of the segments, can have a characteristic length and/or volume, and the ratios and other measures described above apply equally when comparing one of the segments to the other segments shown in FIG. 4.

In a mode of operation, the valves 418 and 420 are open, inlet valve 424 and outlet valve 426 are closed, and the vessels 402, 406, and 408 are evacuated. A feed gas 422 is introduced to the unit operation 400 via inlet valve 416 and flows through vessels 402, 406, and 408 (for example via a plug flow or near plug flow). When a desired quantity of feed gas 422 is introduced (for example when a target pressure in the unit operation 400 is reached, or when another vessel from which the feed gas is obtained reaches a certain level of evacuation, such as an evacuation pressure), valves 418, 420, and 424 are closed and the volumes 402, 406, and 408 isolated from one another.

Subsequently, outlet valve 416 is opened and the gas contents (and desorbed gas if gas separation media is present) of vessel 410 evacuated. Next, valve 420 is opened and the gas contents (and desorbed gas) of vessel 406 evacuated. Finally, valve 418 is opened and the gas contents (and desorbed gas) of vessel 410 evacuated. The gas contents of each segment can be captured and processed separately.

Figure 5:
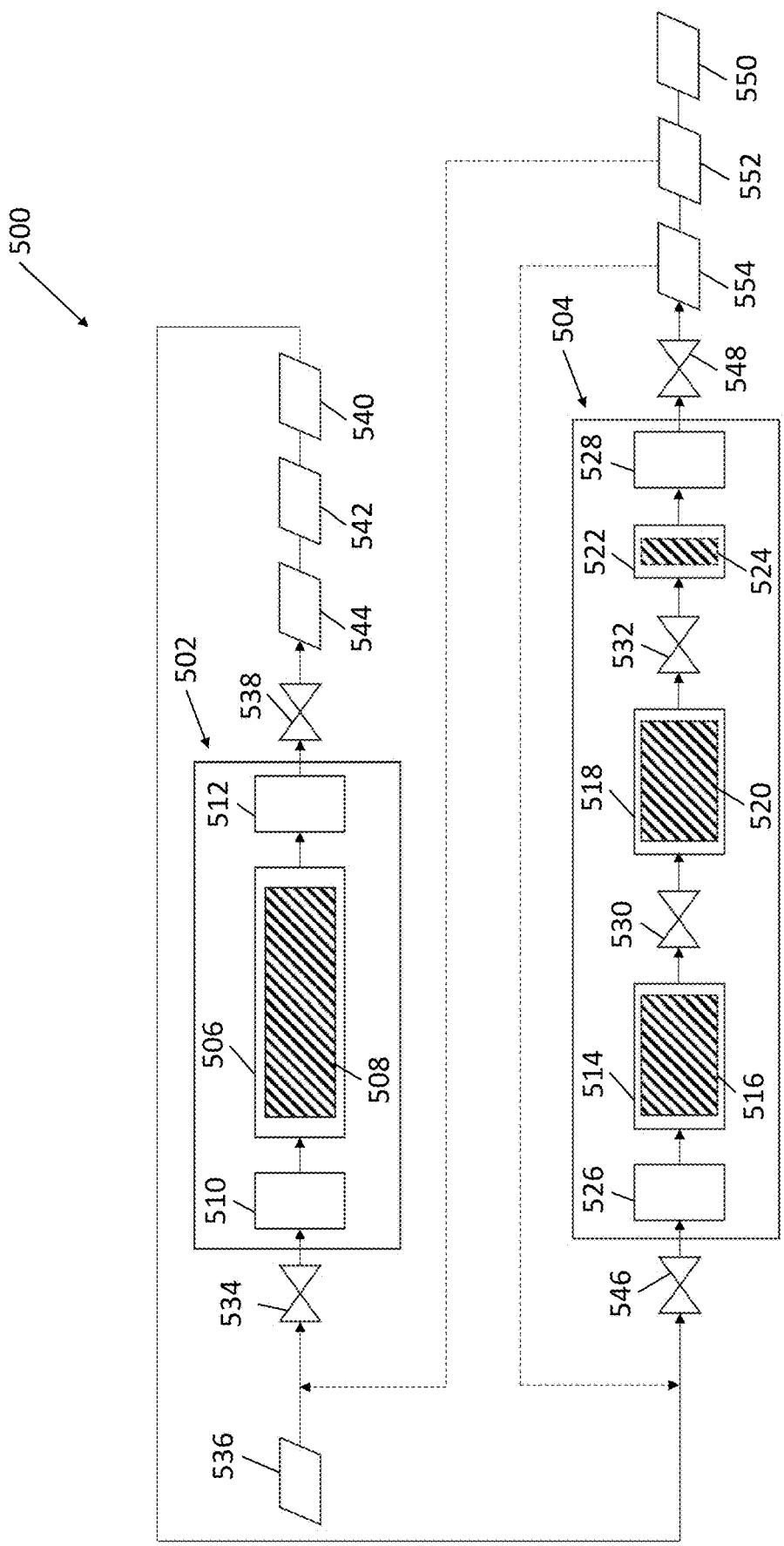
FIG. 5 shows a schematic depiction of a gas separation system.

FIG. 5 depicts a gas separation system 500 comprising two unit operations (502 and 504). Unit operation 502 comprises a vessel 506 and a bed of gas separation media 508 contained in the vessel 506, an inlet 510 to the vessel 506, and an outlet 512 from the vessel 506. Unit operation 504 comprises: an initial vessel 514 and initial segment of gas separation media 516 that is contained in the initial vessel 514; an intermediate vessel 518 and intermediate segment of gas separation media 520 that is contained in the intermediate vessel 518; and a terminal vessel 522 and an optional terminal segment of gas separation media 524 that is contained in the terminal vessel 522. Unit operation 504 further comprises an inlet to the initial vessel 526 and an outlet 528 from the terminal vessel 522. The initial vessel 514 and the intermediate vessel 518 can be brought into fluid communication by opening a first valve 530 interposed therebetween. The intermediate vessel 518 and the terminal vessel 522 can be brought into fluid communication by opening valve 532 interposed therebetween.

In operation, vessel 506 is evacuated and a feed valve 534 is opened and feed gas 536 introduced into vessel 506 via inlet 510 whereby the feed gas 536 is brought into contact with gas separation media 508. Feed gas may be introduced for a period of time or until a target pressure is reached, at which point the feed valve 534 is closed. Flow within the vessel 506 can be plug flow or near plug flow. While the feed gas 536 is in contact with the gas separation media 508, a first component of the feed gas is separated from the feed gas (for example adsorbed or passed through a membrane) via gas separation media 508, resulting in a decreasing concentration of the first component in the direction downstream of the inlet 510 and an increasing concentration of a second component (a second component with less affinity for the adsorbent than the first component) in the direction downstream of the inlet 510.

Gaseous contents of vessel 506 are removed from vessel 506 by opening outlet valve 538 and withdrawing gas from the vessel 506 as a continuous stream (for example by evacuating the vessel 506 using a vacuum pump down to a predetermined pressure). An initial quantity of gas 540 withdrawn from the vessel 506 via outlet 512 has a lower average concentration of the first component than an average concentration of the first component in an intermediate quantity of gas 542 withdrawn from the vessel 506 via outlet 512 and, in turn, the intermediate quantity of gas 542 withdrawn from the vessel 506 stream via outlet 512 has a lower average concentration of the first component than an average concentration of the first component in a last terminal quantity of the gas 544 removed from the vessel 506. Correspondingly, the initial quantity of gas 540 withdrawn from the vessel 506 via outlet 512 has a higher average concentration of the second component than an average concentration of the second component in the intermediate quantity of gas 542 withdrawn from the vessel 506 via outlet 512 and, in turn, the intermediate quantity of gas 542 withdrawn from the vessel 506 via outlet 512 has a higher average concentration of the second component than an average concentration of the second component in the last terminal quantity of the gas 544 removed from the vessel 506.

Vessels 514, 518, and 522 are initially in an evacuated state, inlet valve 546 is closed, valves 530 and 532 are open, and outlet valve 548 is closed. Inlet valve 546 to the unit operation 504 is opened and the initial quantity of gas 540, intermediate quantity of gas 542, and terminal quantity of gas 544 are sequentially introduced to the initial vessel 506 via inlet 526. A portion of each gas quantity (540, 542, and 544) is retained by the initial segment of gas separation media 516 with the balance passing to intermediate vessel 518 and a remainder passing to terminal vessel 522. Flow through the beds of gas separation media (516, 520, and 524) can be plug flow or near plug flow. After the gas quantities (540, 542, and 544) have been introduced, the inlet valve 546 is closed and, subsequently, after a period of time (for example, as soon as the terminal quantity of gas 544 has been introduced; or when pressure equalizes between the initial, intermediate, and terminal vessels (514, 518, and 522)), the valves 530 and 532 are closed to isolate the initial, intermediate, and terminal vessels (514, 518, and 522).

Subsequently, outlet valve 548 is opened and the gas contents (and, if gas separation media is present, desorbed gas) of vessel 522 evacuated to provide a terminal gas product 550. Next, valve 532 is opened and the gas contents (and desorbed gas) of vessel 518 evacuated to provide an intermediate gas product 552. Finally, valve 530 is opened and the gas contents (and desorbed gas) of vessel 514 evacuated to provide an initial gas product 554.

Part or all of the intermediate gas product 552 can be recycled to the inlet of the first unit operation (for example, to increase recovery of a first component). For example, in a cycle, the intermediate gas product 552 can be input into the first input operation 502 before a quantity of the feed gas 536 is input into the first unit operation 502.

In response to a measurement, a portion of the initial gas product 554 can be recycled to the inlet of the second unit operation 504. For example, the measurement may indicate that a concentration of the first component in the feed gas 536 has decreased; the measurement may indicate that a concentration of the first component in the initial gas product 554 has decreased; or the measurement may indicate that a temperature change between thermocouples has increased or decreased to indicate that a concentration gradient of the first component in the unit operation has shifted out of the intermediate volume 518 and into the initial volume 514.

In response to a measurement, a volume of the terminal vessel 522 can be reduced. For example, the measurement may indicate that a concentration of the first component in the feed gas 536 has decreased; the measurement may indicate that a concentration of the first component in the initial gas product 554 has decreased; or the measurement may indicate that a temperature change between thermocouples has increased or decreased to indicate that a concentration gradient of the first component in the unit operation has shifted out of the intermediate volume 518 and into the initial volume 514.

Figure 6:
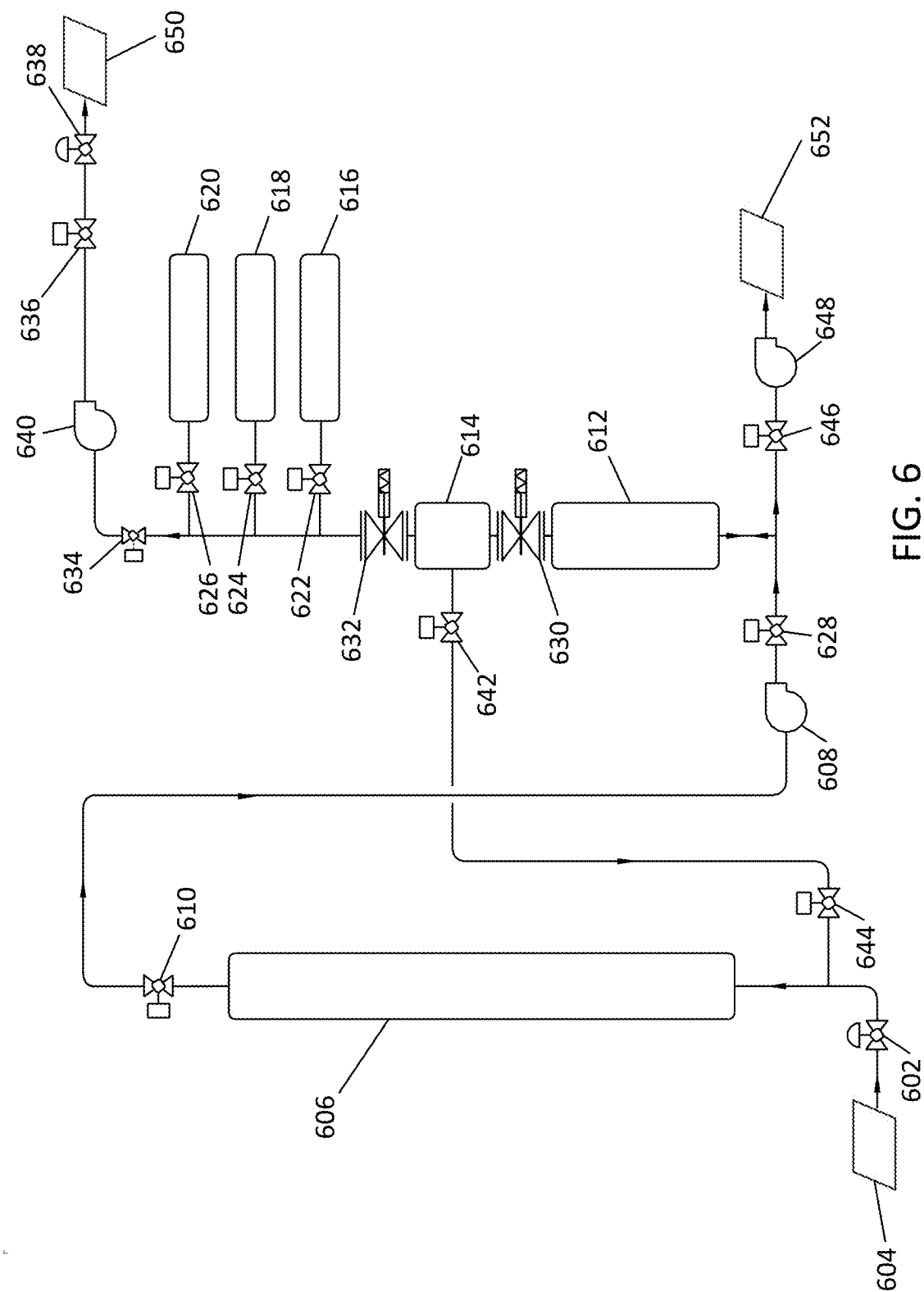
FIG. 6 shows a process flow diagram for an embodiment of the present disclosure.

FIG. 6 shows a process flow diagram 600 in which a flow control valve 602 is opened and a feed gas 604 is introduced into the bottom of a vessel 606 that has been previously evacuated to a pressure in the range of 0.01 PSIA and 14 PSIA by vacuum pump 608 (for example evacuated to a pressure in the range of between 0.1 PSIA and 14 PSIA, for example in the range of between 8 PSIA and 14 PSIA, in the range of between 8 PSIA and 12 PSIA, in the range of between 0.01 PSIA and 1 PSIA, or down to a pressure in the range of between 0.1 PSIA and 5 PSIA). The vessel 606 contains an elongated cylindrical fixed bed of adsorbent approximately coextensive with vessel 606. The vessel can have an inner length-to-diameter ratio in the range of at least 2:1 (for example in the range of between 2:1 and 10:1, for example in the range of between 3:1 and 5:1, in the range of between 3:1 and 4:1, in the range of between 4:1 and 10:1, or the vessel can have a combined length-to-diameter ratio in the range of between 4:1 and 7:1). The vessel can be a stainless-steel tank with a length-to-diameter ratio in the range of 10:1 to 30:1, or higher. The feed gas 604 contains a first component and a second component, and the adsorbent selectively binds to the first component compared to the second component. The feed gas 604 is introduced until the vessel 606 reaches a designated pressure, at which point the flow control valve 602 is closed. For example, the pressure can be 25 PSIG to obtain a first processing capacity, or increased to a higher pressure (for example 50 PSIG or 100 PSIG) to obtain a higher processing capacity.

Next, at a time before the gas in the vessel 606 becomes uniformly mixed (for example less than 1 hour, less than 30 minutes, less than 15 minutes, less than 10 minutes, less than 5 minutes, less than 3 minutes, less than 90 seconds or less than 60 seconds), valve is opened and the vessel 606 evacuated by vacuum pump 608 and compressed and input into vessel 612 (vessels 612, 614, 616, 618, and 620 are initially in an evacuated state) and the gas allowed to flow into vessel 614 and one or more of 616, 618, and 620. Like vessel 606, vessels 612 and 614 contain a bed of adsorbent. By choice of the configuration of valves 622, 624, and 646, gas may be allowed to flow into vessel 616, vessel 618, vessel 620, or a combination of two or more of the foregoing.

When the quantity of gas obtained from vessel 606 has been transferred via vacuum pump 608, valves 628, 630, and 632 are closed whereby vessels 612, 614, and collectively, vessels 616, 618, and 620 are isolated from one another.

Valves 634 and 636 and flow control valve 638 are opened and the contents of one or more of vessels 616, 618, and 620 are evacuated by vacuum pump 640. If the gas 650 recovered from these vessels is a diluent to the gas feed, it may be scrubbed (if necessary) and sent to a flare or, if permissible, vented to the atmosphere. Valves 642 and 644 are opened and gas vented from vessel 614 to evacuated vessel 606. Valves 646 and 648 are opened and gas evacuated from vessel 612 by vacuum pump 648 and product gas 652 obtained.

The separation process can be a nitrogen removal unit in a biogas upgrading plant. For example, the gas separation media may be activated carbon (for example pelletized activated carbon). The nitrogen removal unit can generate a nitrogen-rich waste stream (greater than 80% nitrogen) and a methane rich product stream (greater than 90% methane) from a biogas feed containing 50% to 85% methane. The nitrogen rich waste stream can contain less than 25% (for example less than 10%, less than 5%, in the range of between 5% and 20%, or in the range of between 2% and 10%) of the input methane present in the biogas feed stream.

Figure 7:
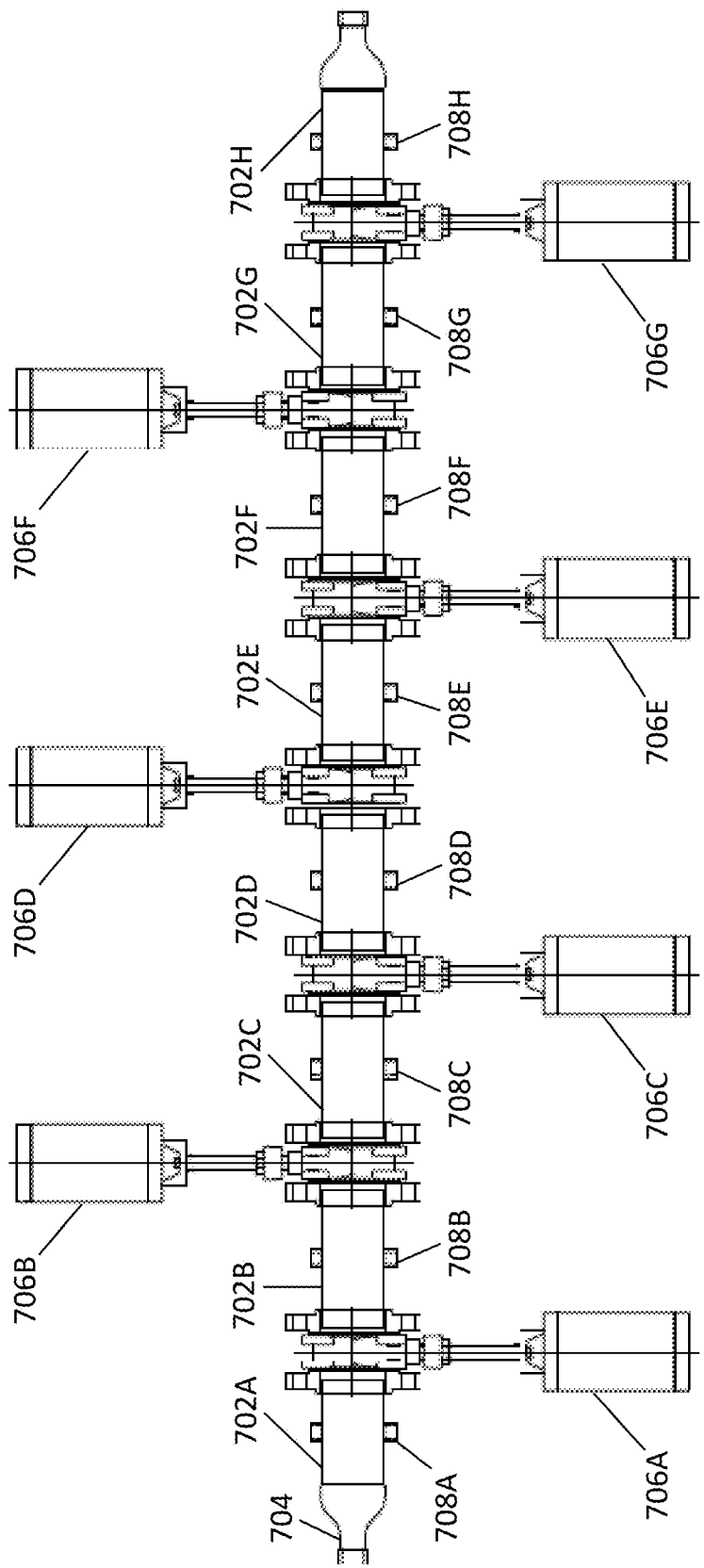
FIG. 7 shows a schematic depiction of an eight-segment gas separation unit.

FIG. 7 shows integrated series of eight adsorbent-containing tanks 702A-H configured to map the concentration profile of components in a gas mixture. Feed gas is input through inlet 704 and fills the eight tanks until a target pressure is reached. When the target pressure is reached, valves 706A-G are closed to isolate each tank. Each tank is separately evacuated down to a low pressure (for example 0.4 PSIA) through ports 708A-H and the composition and the volume at a given pressure (or pressure in a given volume) of each withdrawn sample measured. Composition can be measured, for example, by a gas chromatograph.

EXAMPLES

First Stage Separator: As schematically depicted in FIG. 3, the First Stage Separator comprised a steel vessel 72 inches in length and 3 inches inner diameter filled activated carbon pellets 1 mm in diameter and 2 mm in length sold under the trade name Cabot® RB3, which were retained within the PVC pipe by a layer of stainless-steel wool and perforated plates at each end.

Figure 8:
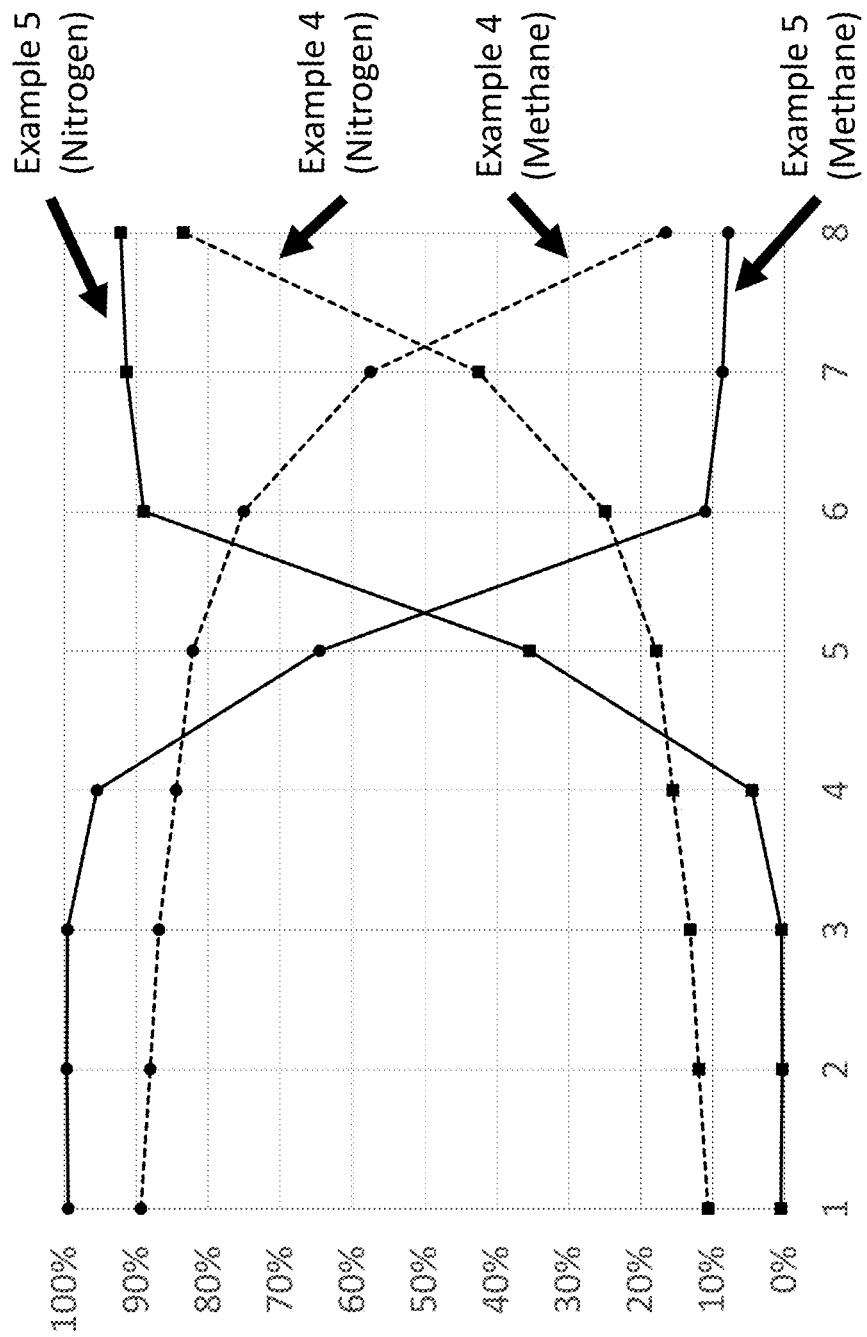
FIG. 8 is a graph showing concentration profiles of mixed gas components in first and second stages of separation.
Figure 9:
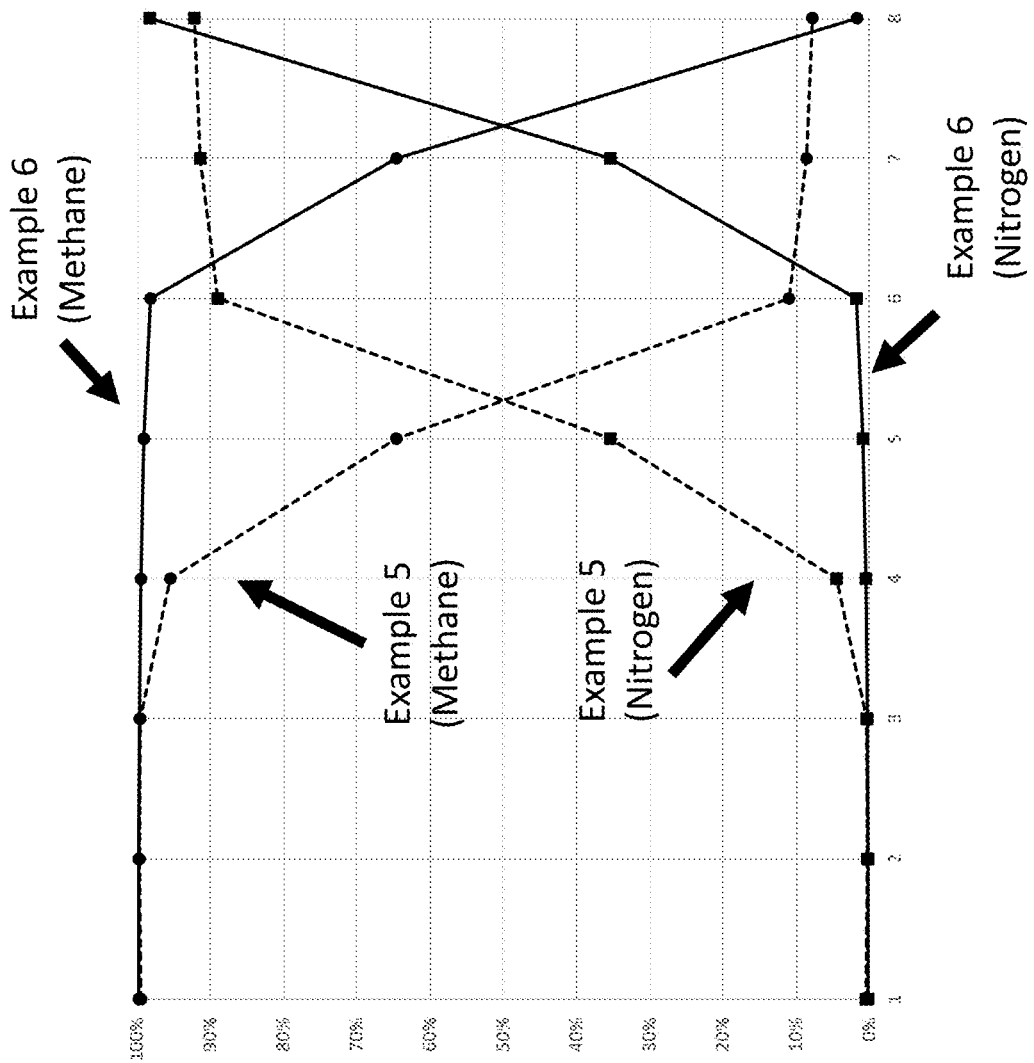
FIG. 9 is a graph showing concentration profiles of mixed gas components under two modes of operation.

Multiple Bed Mapping Separator ("Map separator"): As schematically depicted in FIG. 8, a series of 8 segments each containing an adsorbent bed were arranged in series. The adsorbent beds consisted of the Cabot® RB3 activated carbon pellets described above. The volume contribution of each bed is shown in Table 2. Each bed was contained within a three inch diameter steel pipe with a layer of stainless-steel wool and perforated plates at each end. Fluid communication between adjacent segments was regulated by gate valves between the segments. Each segment had a coupling in the wall of the PVC pipe configured to be connected to a vacuum pump. In operation, all eight tanks were evacuated and then gas was introduced via the first segment with all eight segments in open fluid communication. Then the gate valves were closed to isolate each segment. Contents of each segment were separately evacuated through the appropriate port via the vacuum pump and stored for measurement of gas composition using a gas chromatograph.

TABLE 2

| Bed Segment | Segment Volume (% of total) |
|---|---|
| 1 | 14.0 |
| 2 | 12.0 |
| 3 | 12.0 |
| 4 | 12.0 |
| 5 | 12.0 |
| 6 | 12.0 |
| 7 | 12.0 |
| 8 | 14.0 |
| Total | 100.0 |

Gas Chromatograph: Concentration of gas components in the vessel were measured with an ABB TotalFlow gas chromatograph.

Examples 1-3: Concentration and mass distribution profiles for separation of three gas mixtures of methane and nitrogen were obtained. In each experiment, the gas mixture was introduced into the Map Separator up to a pressure of 25 psig, then each segment was isolated, evacuated to 0.5 psig, and GC measurements obtained. Results are shown in Tables 3-4.

TABLE 3

Methane Concentration Results for Examples 1-3

| | Example 1 Feed: 87.5 mole % $CH_4$ | | Example 2 Feed: 75 mole % $CH_4$ | | Example 3 Feed: 50 mole % $CH_4$ | |
|---|---|---|---|---|---|---|
| Segment | Mole %[1] | % of Total[2] | Mole % | % of Total | Mole % | % of Total |
| 1 | 95.2 | 14.47 | 87.0 | 16.04 | 76.7 | 20.83 |
| 2 | 94.8 | 14.13 | 87.1 | 17.34 | 73.4 | 19.22 |
| 3 | 94.3 | 14.46 | 83.4 | 15.84 | 70.9 | 18.39 |
| 4 | 93.0 | 13.79 | 81.3 | 14.60 | 65.0 | 16.01 |
| 5 | 92.1 | 13.75 | 77.1 | 14.09 | 54.6 | 12.68 |
| 6 | 89.6 | 12.81 | 71.9 | 12.75 | 35.7 | 7.69 |
| 7 | 86.0 | 11.97 | 55.5 | 8.68 | 14.0 | 2.98 |
| 8 | 46.4 | 4.62 | 5.5 | 0.67 | 10.1 | 2.20 |

[1] Percentage equal to (a) the moles of gaseous component and adsorbed component per unit of volume containing the adsorbent in the segment divided by (b) the total moles of all gas and adsorbed gas components per unit of volume containing the adsorbent in the segment.
[2] Mass Distribution Percentage equal to (a) the moles of gaseous component and adsorbed component per unit of volume containing the adsorbent in the segment divided by (b) the moles of gaseous component and adsorbed component per unit of volume containing the adsorbent in all segments.

TABLE 4

Nitrogen Concentration Results for Examples 1-3

| | Example 1 Feed: 12.5 mole % $N_2$ | | Example 2 Feed: 25 mole % $N_2$ | | Example 3 Feed: 50 mole % $N_2$ | |
|---|---|---|---|---|---|---|
| Segment | Mole % | % of Total | Mole % | % of Total | Mole % | % of Total |
| 1 | 4.8 | 5.39 | 13.0 | 6.15 | 23.3 | 7.83 |
| 2 | 5.2 | 5.71 | 12.9 | 6.55 | 26.6 | 8.66 |
| 3 | 5.7 | 6.56 | 16.6 | 8.07 | 29.1 | 9.35 |
| 4 | 7.0 | 7.69 | 18.7 | 8.62 | 35.0 | 10.59 |
| 5 | 7.9 | 8.74 | 22.9 | 10.74 | 45.4 | 12.81 |
| 6 | 10.4 | 11.11 | 28.1 | 12.77 | 64.3 | 15.64 |
| 7 | 14.5 | 15.07 | 44.5 | 17.81 | 86.0 | 17.93 |
| 8 | 53.6 | 39.72 | 94.5 | 29.28 | 89.9 | 17.19 |

Examples 4-5: In Example 4, a gas mixture consisting of 25% Nitrogen and 75% Methane was processed in the Map Separator and concentration and mass distribution profiles obtained. In Example 5, a gas mixture consisting of 25% Nitrogen and 75% Methane was processed in the First Stage Separator, the output of which was then processed in the Map separator and concentration and mass distribution profiles obtained. In each experiment, the gas mixture was introduced processed at a pressure of 25 psig. In Example 5, contents were evacuated to 0.5 psig in the First Stage Separator and pumped into the Map separator. Results are shown in Tables 5-6 and FIG. 7.

TABLE 5

Methane Concentration Results for Examples 4-5
Feed: 75 mole % $CH_4$

| | Example 4 First Stage Separation | | Example 5 Second Stage Separation | |
|---|---|---|---|---|
| Segment | Mole % $CH_4$ | % of Total | Mole % $CH_4$ | % of Total |
| 1 | 89.4 | 16.14 | 99.5 | 21.26 |
| 2 | 88.1 | 16.05 | 99.7 | 22.54 |
| 3 | 86.9 | 16.08 | 99.6 | 23.06 |
| 4 | 84.5 | 14.74 | 95.5 | 20.42 |
| 5 | 82.2 | 14.38 | 64.6 | 9.81 |
| 6 | 75.1 | 12.38 | 11.0 | 1.21 |
| 7 | 57.5 | 8.42 | 8.6 | 0.94 |
| 8 | 16.5 | 1.81 | 7.8 | 0.76 |

TABLE 6

Nitrogen Concentration Results for Examples 4-5
Feed: 25 mole % $N_2$

| | Example 4 First Stage Separation | | Example 5 Second Stage Separation | |
|---|---|---|---|---|
| Segment | Mole % $N_2$ | % of Total | Mole % $N_2$ | % of Total |
| 1 | 10.6 | 6.01 | 0.5 | 0.31 |
| 2 | 11.9 | 6.84 | 0.2 | 0.17 |
| 3 | 13.1 | 7.63 | 0.4 | 0.28 |
| 4 | 15.5 | 8.47 | 4.4 | 2.71 |
| 5 | 17.8 | 9.82 | 35.4 | 15.23 |
| 6 | 24.9 | 12.90 | 89.0 | 27.45 |
| 7 | 42.5 | 19.57 | 91.4 | 28.36 |
| 8 | 83.5 | 28.76 | 92.2 | 25.49 |

Example 6 (with comparison to Example 5): A gas mixture consisting of 25% Nitrogen and 75% Methane was processed in the First Stage Separator, the output of which was then processed in the Map separator, followed by injection of 2 cubic feet of 100% methane into the MAP Separator while venting from segment 8 at constant pressure, and concentration and mass distribution profiles obtained. In the experiment, the gas mixture was introduced into the First Stage Separator up to a pressure of 25 psig, and then the contents were evacuated to 0.5 psig and pumped into segment 1 of the Map separator. Results are shown in Tables 7-8 and FIG. 8.

TABLE 7

Methane Concentration Results for Example 6 (compared to Example 5)
Feed: 75 mole % $CH_4$

| | Example 5 Second Stage Separation | | Example 6 Augmented Second Stage Separation | |
|---|---|---|---|---|
| Segment | Mole % $CH_4$ | % of Total | Mole % $CH_4$ | % of Total |
| 1 | 99.5 | 21.26 | 99.8 | 16.29 |
| 2 | 99.7 | 22.54 | 99.8 | 16.11 |
| 3 | 99.6 | 23.06 | 99.7 | 16.33 |
| 4 | 95.5 | 20.42 | 99.5 | 14.84 |
| 5 | 64.6 | 9.81 | 99.1 | 15.33 |
| 6 | 11.0 | 1.21 | 98.2 | 13.90 |
| 7 | 8.6 | 0.94 | 64.6 | 7.09 |
| 8 | 7.8 | 0.76 | 1.7 | 0.12 |

TABLE 8

Nitrogen Concentration Results for Example 6 (compared to Example 5)
Feed: 25 mole % $N_2$

| | Example 5 Second Stage Separation | | Example 6 Augmented Second Stage Separation | |
|---|---|---|---|---|
| Segment | Mole % $N_2$ | % of Total | Mole % $N_2$ | % of Total |
| 1 | 0.5 | 0.31 | 0.2 | 0.32 |
| 2 | 0.2 | 0.17 | 0.2 | 0.25 |
| 3 | 0.4 | 0.28 | 0.3 | 0.38 |
| 4 | 4.4 | 2.71 | 0.5 | 0.61 |
| 5 | 35.4 | 15.23 | 0.9 | 1.25 |
| 6 | 89.0 | 27.45 | 1.8 | 2.17 |
| 7 | 91.4 | 28.36 | 35.4 | 33.95 |
| 8 | 92.2 | 25.49 | 98.3 | 61.07 |

Example 7 (with comparison to Example 5): A gas mixture consisting of 25% Nitrogen and 75% Methane was processed in the First Stage Separator, the output of which was then processed through a further First Stage Separator and then processed in the Map separator. In the experiment, the gas mixture was introduced into the First Stage Separators up to a pressure of 25 psig, and then the contents were evacuated to 0.5 psig, and the resulting gas pumped into the Map separator. Results are shown in Tables 9-10.

TABLE 9

Methane Concentration Results for Example 7 (compared to Example 5)
Feed: 75 mole % $CH_4$

| | Example 5 Second Stage Separation | | Example 7 Third Stage Separation | |
|---|---|---|---|---|
| Segment | Mole % $CH_4$ | % of Total | Mole % $CH_4$ | % of Total |
| 1 | 99.5 | 21.26 | 99.6 | 21.66 |
| 2 | 99.7 | 22.54 | 99.6 | 22.64 |
| 3 | 99.6 | 23.06 | 99.6 | 23.57 |
| 4 | 95.5 | 20.42 | 98.4 | 21.86 |
| 5 | 64.6 | 9.81 | 63.0 | 9.27 |

TABLE 9-continued

Methane Concentration Results for Example 7 (compared to Example 5)
Feed: 75 mole % $CH_4$

| | Example 5 Second Stage Separation | | Example 7 Third Stage Separation | |
|---|---|---|---|---|
| Segment | Mole % $CH_4$ | % of Total | Mole % $CH_4$ | % of Total |
| 6 | 11.0 | 1.21 | 3.5 | 0.40 |
| 7 | 8.6 | 0.94 | 3.0 | 0.30 |
| 8 | 7.8 | 0.76 | 3.0 | 0.31 |

TABLE 10

Nitrogen Concentration Results for Example 7 (compared to Example 5)
Feed: 25 mole % $N_2$

| | Example 5 Second Stage Separation | | Example 7 Third Stage Separation | |
|---|---|---|---|---|
| Segment | Mole % $N_2$ | % of Total | Mole % $N_2$ | % of Total |
| 1 | 0.5 | 0.31 | 0.4 | 0.25 |
| 2 | 0.2 | 0.17 | 0.4 | 0.22 |
| 3 | 0.4 | 0.28 | 0.4 | 0.25 |
| 4 | 4.4 | 2.71 | 1.6 | 0.97 |
| 5 | 35.4 | 15.23 | 37.0 | 14.96 |
| 6 | 89.0 | 27.45 | 96.7 | 29.99 |
| 7 | 91.4 | 28.36 | 97.0 | 26.13 |
| 8 | 92.2 | 25.49 | 97.0 | 27.24 |

Example 8: A gas mixture consisting of 25% Nitrogen and 75% Methane was processed the First Stage Separator, the output of which was then processed in a series of steel vessels linked in series. The first vessel in series corresponded to the combine volumes and adsorbent quantities of segments 1-4 of the Map Separator; the second vessel in series corresponded to the combine volumes and adsorbent quantities of segments 5 of the Map Separator; the third vessel in series corresponded to approximately five times the combined volumes of segments 6-8. No adsorbent was present in the third vessel. In the experiment, the gas mixture was introduced into the First Stage Separator up to a pressure of 25 psig, and then the contents were evacuated to 0.5 psig and pumped into the series of three vessels. Results are shown in Table 11.

TABLE 11

Results for Example 8 (compared to Example 5)
Feed: 75 Mole % $CH_4$; 25 Mole % $N_2$

| | Methane | | Nitrogen | |
|---|---|---|---|---|
| Vessel | Mole % $CH_4$ | % of Total | Mole % $N_2$ | % of Total |
| 1 | 99.6 | 88.04 | 0.4 | 1.14 |
| 2 | 84.0 | 11.70 | 16.0 | 6.54 |
| 3 | 0.8 | 0.26 | 99.2 | 92.31 |

Example 9 (with comparison to Example 3): The Map Separator was filled with 1.5 cubic feet of Methane and then further pressurized by adding 1.5 cubic feet of Nitrogen via inlet at segment 8 (top of Map Separator) resulting in a pressure of 10 PSIG. Contents were evacuated to 0.5 psig and results are shown in Tables 12-13.

TABLE 12

Methane Concentration Results for Example 9 (compared to Example 3)

| Segment | Example 3 Single Stage Separation | | Example 9 Single Stage Separation | |
|---|---|---|---|---|
| | Mole % $CH_4$ | % of Total | Mole % $CH_4$ | % of Total |
| 1 | 76.7 | 20.83 | 88.8 | 30.01 |
| 2 | 73.4 | 19.22 | 75.9 | 22.46 |
| 3 | 70.9 | 18.39 | 65.5 | 18.42 |
| 4 | 65.0 | 16.01 | 53.1 | 13.18 |
| 5 | 54.6 | 12.68 | 40.2 | 9.16 |
| 6 | 35.7 | 7.69 | 22.2 | 4.76 |
| 7 | 14.0 | 2.98 | 8.2 | 1.71 |
| 8 | 10.1 | 2.20 | 1.6 | 0.30 |

TABLE 13

Nitrogen Concentration Results for Example 9 (compared to Example 3)

| Segment | Example 3 Single Stage Separation | | Example 9 Single Stage Separation | |
|---|---|---|---|---|
| | Mole % $N_2$ | % of Total | Mole % $N_2$ | % of Total |
| 1 | 23.3 | 7.83 | 11.2 | 3.82 |
| 2 | 26.6 | 8.66 | 24.1 | 7.18 |
| 3 | 29.1 | 9.35 | 34.5 | 9.76 |
| 4 | 35.0 | 10.59 | 46.9 | 11.68 |
| 5 | 45.4 | 12.81 | 59.8 | 13.68 |
| 6 | 64.3 | 15.64 | 77.8 | 16.75 |
| 7 | 86.0 | 17.93 | 91.8 | 19.14 |
| 8 | 89.9 | 17.19 | 98.4 | 17.99 |

Example 10 (with comparison to Example 3): The Map Separator was filled with 1.5 cubic feet of Nitrogen and then further pressurized by adding 1.5 cubic feet of Methane via inlet at segment 8 (top of Map Separator) resulting in a pressure of 10 PSIG. Contents were evacuated to 0.5 psig and results are shown in Tables 14-15.

TABLE 14

Methane Concentration Results for Example 10 (compared to Example 3)

| Segment | Example 3 Single Stage Separation | | Example 9 Single Stage Separation | |
|---|---|---|---|---|
| | Mole % $CH_4$ | % of Total | Mole % $CH_4$ | % of Total |
| 1 | 76.7 | 20.83 | 0.6 | 0.10 |
| 2 | 73.4 | 19.22 | 0.4 | 0.07 |
| 3 | 70.9 | 18.39 | 4.1 | 0.71 |
| 4 | 65.0 | 16.01 | 40.8 | 7.92 |
| 5 | 54.6 | 12.68 | 70.1 | 16.88 |
| 6 | 35.7 | 7.69 | 82.9 | 21.46 |
| 7 | 14.0 | 2.98 | 90.3 | 26.10 |
| 8 | 10.1 | 2.20 | 95.4 | 26.76 |

TABLE 15

Nitrogen Concentration Results for Example 10 (compared to Example 3)

| Segment | Example 3 Single Stage Separation | | Example 9 Single Stage Separation | |
|---|---|---|---|---|
| | Mole % $N_2$ | % of Total | Mole % $N_2$ | % of Total |
| 1 | 23.3 | 7.83 | 99.4 | 21.72 |
| 2 | 26.6 | 8.66 | 99.5 | 21.29 |
| 3 | 29.1 | 9.35 | 95.8 | 21.27 |
| 4 | 35.0 | 10.59 | 59.2 | 15.07 |
| 5 | 45.4 | 12.81 | 29.9 | 9.45 |
| 6 | 64.3 | 15.64 | 17.1 | 5.81 |
| 7 | 86.0 | 17.93 | 9.7 | 3.68 |
| 8 | 89.9 | 17.19 | 4.6 | 1.70 |

What is claimed is:

1. A separation process, comprising:
   inputting a gas input stream into a volume until one or more predetermined criteria are met, the gas input stream having an input concentration profile comprising an increase in concentration of a component of the gas input stream during the inputting and a maximum input concentration of the component of the gas input stream during the inputting, the volume containing plural elements that selectively adsorb the component relative to at least one further component and that restrict gas-phase mixing between a first location within the volume and a second location within the volume; and
   subsequent to at least partially evacuating the volume, outputting a gas output stream from the volume, the gas output stream having an output concentration profile of the component in the gas output stream comprising a maximum output concentration that is greater than the maximum input concentration of the component,
   wherein the concentration of the component is moles of the component divided by a sum of moles of the component and the at least one further component.

2. The separation process of claim 1, wherein the volume is partially evacuated.

3. The separation process of claim 2, wherein the partially evacuated volume is at a pressure of less than 1 PSIA.

4. The separation process of claim 1, wherein the component is methane.

5. The separation process of claim 3, wherein the one or more predetermined criteria comprises a pressure within the vessel of at least 14 PSIA.

6. The separation process of claim 1, wherein the plural elements form a packed bed of particles.

7. The separation process of claim 1, wherein the plural elements comprise a quantity of pelletized activated carbon.

8. The separation process of claim 6, wherein a flow of the gas input stream through the packed bed is substantially plug flow.

9. The separation process of claim 1, wherein the gas input stream is obtained by further inputting a feed gas having a constant concentration of the component and a further constant concentration of the at least one further component into a further separation process and obtaining the gas input stream from a further gas output stream of the further separation unit.

10. The separation process of claim 9, wherein the feed gas is a biogas comprising nitrogen and methane.

11. The separation process of claim 9, wherein the further separation process is a nitrogen rejection unit.

12. The separation process of claim 11, wherein the nitrogen rejection unit is a tail gas nitrogen rejection unit.

13. The separation process of claim 9, further comprising: obtaining a first portion of the further gas output stream of the further separation unit followed by obtaining a second portion of the further gas output stream of the further separation unit, wherein the inputting comprises inputting the second portion of the further gas output stream of the further separation unit into the volume followed by inputting the first portion of the further gas output stream of the further separation unit into the volume.

14. The separation process of claim 1, wherein forming the gas input stream comprises injecting the at least one further component into a feed gas prior to the inputting.

15. The separation process of claim 1, wherein the gas output stream has a gas output volume that consists a first output volume having a concentration profile with a maximum first output component concentration that is less than or equal a maximum first output concentration; a second output volume having a concentration profile with a minimum second output component concentration that is greater than the maximum first output concentration and a maximum second output component concentration that is less than a minimum third output concentration; and a third output volume having a concentration profile with a minimum third output component concentration that is greater than or equal to the minimum third output concentration, wherein:
   (i) the component is methane;
   (ii) the at least one further component is nitrogen;
   (iii) the first output concentration is less than 3%;
   (iv) the minimum third output concentration is greater than 97%; and
   (v) the ratio of the second output volume to the gas output volume is less than 10%.

16. The separation process of claim 15, wherein the first output volume is sent to a flare.

17. The separation process of claim 15, wherein the second output volume is a feedstock to the separation process.

18. The separation process of claim 15, further comprising: generating a Renewable Identification Number associated with the third output volume.

19. A separation process, comprising:
inputting a gas component into a vessel through a first opening defined by the vessel until one or more predetermined criteria are met, the vessel containing plural elements that have an affinity to adsorb the gas component relative to a further gas component and that restrict gas-phase mixing between the first opening of the vessel and a second opening of the vessel;
withdrawing at least a portion of the gas component from the vessel through the second opening of the vessel;
followed by reducing a quantity of the gas component proximate the second opening by passing a quantity of the further gas component into the vessel through the second opening while maintaining the vessel under a partial vacuum and withdrawing at least a portion of the quantity of the further gas component from the vessel, the affinity of the plural elements to adsorb the further gas component being lower than the affinity of the plural elements to adsorb the gas component.

20. A separation process, comprising:
inputting a gas component into a vessel through a first opening defined by the vessel until one or more predetermined criteria are met, the vessel containing plural elements that have an affinity to adsorb the gas component relative to a further gas component and that restrict gas-phase mixing between the first opening of the vessel and a second opening of the vessel;
withdrawing at least a portion of the gas component from the vessel through the second opening of the vessel; followed by
reducing a quantity of the gas component proximate the second opening by passing a quantity of the further gas component into the vessel through the second opening while increasing pressure in the vessel, the affinity of the plural elements to adsorb the further gas component being lower than the affinity of the plural elements to adsorb the gas component.

* * * * *